(12) United States Patent
Grivna et al.

(10) Patent No.: US 8,525,799 B1
(45) Date of Patent: Sep. 3, 2013

(54) DETECTING MULTIPLE SIMULTANEOUS TOUCHES ON A TOUCH-SENSOR DEVICE

(75) Inventors: Edward L. Grivna, Brooklyn Park, MN (US); Jason Konstas, Tokyo (JP); Carl Brasek, San Diego, CA (US)

(73) Assignee: Cypress Semiconductor Conductor, San Jose, CA (US)

( * ) Notice: Subject to any disclaimer, the term of this patent is extended or adjusted under 35 U.S.C. 154(b) by 1559 days.

(21) Appl. No.: 12/079,866

(22) Filed: Mar. 28, 2008

Related U.S. Application Data

(60) Provisional application No. 60/913,695, filed on Apr. 24, 2007.

(51) Int. Cl.
*G06F 3/041* (2006.01)

(52) U.S. Cl.
USPC .................................................. 345/173

(58) Field of Classification Search
None
See application file for complete search history.

(56) References Cited

U.S. PATENT DOCUMENTS

| | | | |
|---|---|---|---|
| 4,293,734 A | 10/1981 | Pepper, Jr. | |
| 4,736,191 A | 4/1988 | Matzke et al. | |
| 5,305,017 A | 4/1994 | Gerpheide | |
| 5,543,590 A | 8/1996 | Gillespie et al. | |
| 5,543,591 A | 8/1996 | Gillespie et al. | |
| 5,589,856 A | 12/1996 | Stein et al. | |
| 5,748,185 A | 5/1998 | Stephan et al. | |
| 5,825,352 A | 10/1998 | Bisset et al. | |
| 5,943,052 A | 8/1999 | Allen et al. | |
| 6,028,271 A | 2/2000 | Gillespie et al. | |
| 6,037,929 A | 3/2000 | Ogura et al. | |
| 6,188,391 B1 | 2/2001 | Seely et al. | |
| 6,239,389 B1 | 5/2001 | Allen et al. | |
| 6,262,717 B1 | 7/2001 | Donohue et al. | |
| 6,380,931 B1 | 4/2002 | Gillespie et al. | |
| 6,414,671 B1 | 7/2002 | Gillespie et al. | |
| 6,473,069 B1 | 10/2002 | Gerpheide | |
| 6,704,005 B2 | 3/2004 | Kato et al. | |
| 6,825,890 B2 | 11/2004 | Matsufusa | |
| 6,856,259 B1 * | 2/2005 | Sharp | 341/5 |
| 7,030,860 B1 | 4/2006 | Hsu et al. | |
| 7,253,643 B1 | 8/2007 | Seguine | |
| 7,288,946 B2 | 10/2007 | Hargreaves et al. | |

(Continued)

OTHER PUBLICATIONS

Ryan Seguine, et al., "Layout Guidelines for PSoC™ CapSense™", Cypress Application Note AN2292, Revision B, Oct. 31, 2005, pp. 1-15.

(Continued)

*Primary Examiner* — Alexander S Beck
*Assistant Examiner* — Kirk Hermann

(57) ABSTRACT

An apparatus and a method for resolving locations of two or more substantially simultaneous touches on a split touch-sensor device. The method may include detecting multiple substantially simultaneous touches on a touch-sensor device having multiple sections in at least one dimension of the touch-sensor device, and resolving locations of the multiple substantially simultaneous touches on the touch-sensor device without an all-points-addressable (APA) array. Resolving the multiple locations includes resolving a first location in a first section of the multiple sections and resolving a second location in a second section that is adjacent to the first section of the touch-sensor device. The apparatus may include a first set of sensor elements disposed in a first axis in a plane of a touch-sensor device, and a second set of sensor elements and a third set of sensor elements disposed in a second axis in the plane.

18 Claims, 15 Drawing Sheets

(56) References Cited

U.S. PATENT DOCUMENTS

| | | | |
|---|---|---|---|
| 7,301,350 | B2 | 11/2007 | Hargreaves et al. |
| 2004/0252109 | A1 | 12/2004 | Trent, Jr. et al. |
| 2006/0066582 | A1 | 3/2006 | Lyon et al. |
| 2006/0091301 | A1* | 5/2006 | Trisnadi et al. ............... 250/226 |
| 2006/0097991 | A1 | 5/2006 | Hotelling et al. |
| 2007/0062852 | A1* | 3/2007 | Zachut et al. ................. 209/683 |
| 2007/0271399 | A1* | 11/2007 | Peng et al. ........................ 710/1 |
| 2007/0279395 | A1* | 12/2007 | Philipp et al. .................. 345/173 |
| 2008/0158167 | A1* | 7/2008 | Hotelling et al. ............. 345/173 |
| 2008/0162996 | A1* | 7/2008 | Krah et al. ...................... 714/27 |

OTHER PUBLICATIONS

Dennis Seguine, "Capacitive Switch Scan", Cypress Appilcation Note AN2233a, Revision B, Apr. 14, 2005, pp. 1-6.

Dave Van Ess, "Understanding Switched Capacitor Analog Blocks", Cypress Application Note AN2041, Revision 8, Mar. 30, 2004, pp. 1-1.

Mark Lee, "CapSense Best Practices", Cypress Application Note AN2394, Rev. \*\*, Oct. 19, 2006, pp. 1-10.

Mark Lee, "The Art of Capacitive Touch Sensing", Cypress Perform, Published in Embedded.com (http://www.embedded.com.

CSR User Module Data Sheet, CSR v1.0, CY8C21x34 Data Sheet, Oct. 6, 2006, pp. 1-36.

CSD User Module Data Sheet, CSD v1.0, Oct. 23, 2006, pp. 1-58.

Robert Jania, "Cypress CapSense Successive Approximation Algorithm", White Paper CSA RJO.doc, Jan. 17, 2007, pp. 1-6.

Wayne Westerman, "Hand Tracking, Finger Identification, and Chronic Manipulation on a Multi-Touch Surface", Spring 1999, pp. i-xxx and 1-333.

\* cited by examiner

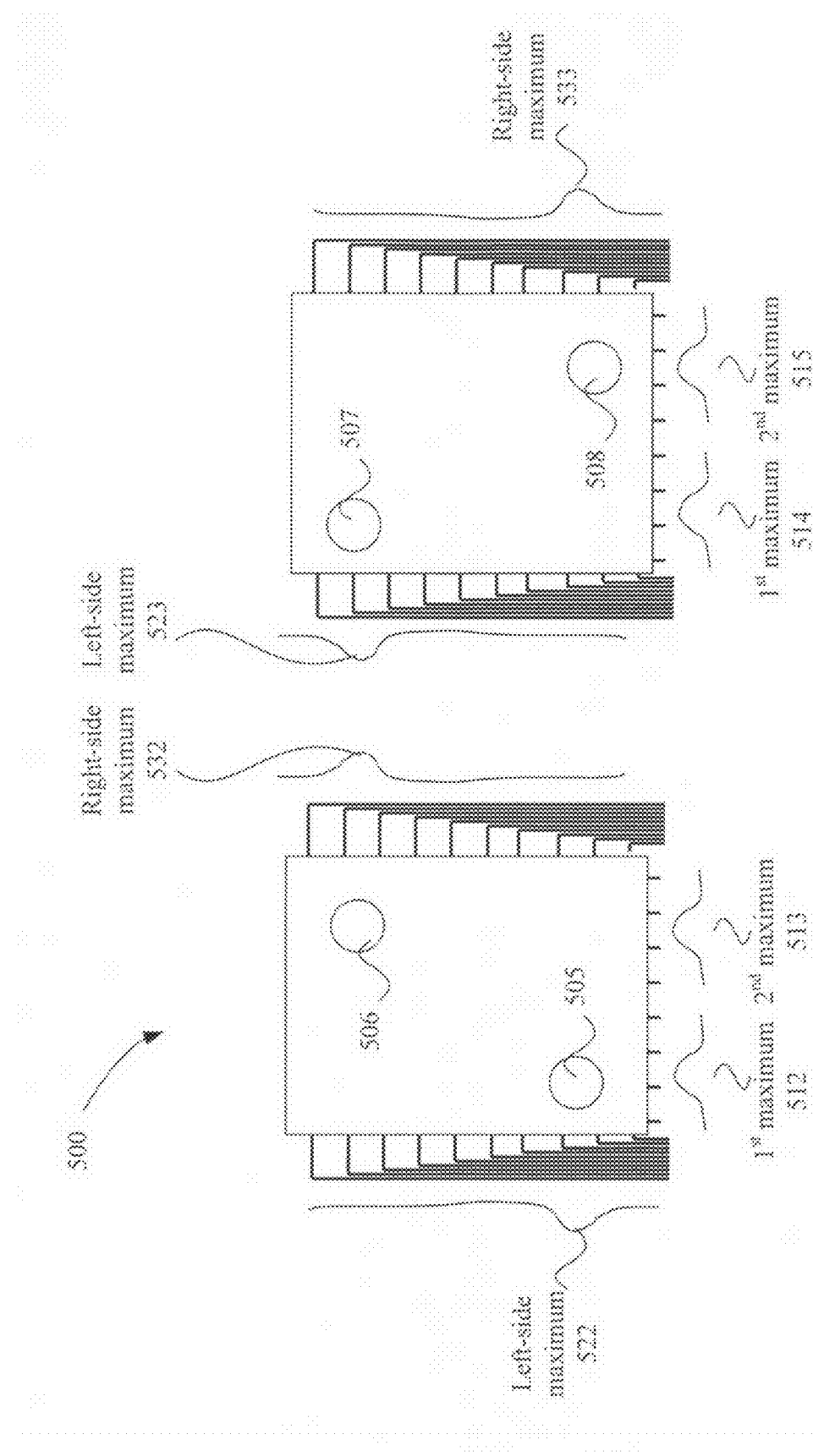

DETECTING MULTIPLE SIMULTANEOUS TOUCHES ON A TOUCH-SENSOR DEVICE

RELATED APPLICATION

This application claims the benefit of U.S. Provisional Application No. 60/913,695, filed Apr. 24, 2007, the entire contents of which are hereby incorporated by reference herein.

TECHNICAL FIELD

This invention relates to the field of user interface devices and, in particular, to touch-sensor devices.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of a conductive object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

One type of touchpad operates by way of capacitance sensing utilizing capacitance sensors. The capacitance, detected by a capacitance sensor, changes as a function of the proximity of a conductive object to the sensor. The conductive object can be, for example, a stylus or a user's finger. In a touch-sensor device, a change in capacitance detected by each sensor in the X and Y dimensions of the sensor array due to the proximity or movement of a conductive object can be measured by a variety of methods. Regardless of the method, usually an electrical signal representative of the capacitance detected by each capacitive sensor is processed by a processing device, which in turn produces electrical or optical signals representative of the position of the conductive object in relation to the touch-sensor pad in the X and Y dimensions. A touch-sensor strip, slider, or button operates on the same capacitance-sensing principle.

Another user interface device that has become more common is a touch screen. Touch screens, also known as touchscreens, touch panels, or touchscreen panels are display overlays which are typically either pressure-sensitive (resistive), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. There are a number of types of touch screen technologies, such as optical imaging, resistive, surface acoustical wave, capacitive, infrared, dispersive signal, piezoelectric, and strain gauge technologies. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data.

A first type of conventional touchpad is composed of a matrix of rows and columns. Within each row or column, there are multiple sensor elements. However, all sensor pads within each row or column are coupled together and operate as one long sensor element. The number of touches a touchpad can detect is not the same as the resolution of the touchpad. For example, even though a conventional touchpad may have the capability to detect two substantially simultaneous touches with an XY matrix, the conventional touchpad cannot resolve the location of the two substantially simultaneous touches. The only conventional way to resolve the location of a second touch is if the touches arrive sequentially in time. This allows the remaining potential locations to be evaluated to determine which locations are "actual touch" locations and which are invalid touches, also referred to as "ghost touch" locations. If both touches arrive or are detected substantially simultaneously, there is no way to resolve which of the two pairs of potential locations constitute "actual" touches, instead of invalid touches (e.g., "ghost" touches). Thus, the conventional two-axis touchpads are configured to resolve only a location of a single touch. Similarly, conventional touch screens are designed to detect the presence and location of a single touch.

In its minimalist form, multi-touch detection requires a two-layer implementation: one to support rows and the other columns. Additional axes, implemented on touch screens using additional layers, can allow resolution of additional simultaneous touches, but these additional layers come at a significant cost both in terms of materials and yield loss. Likewise the added rows/columns/diagonals used in multi-axial scanning may also take additional time to scan, and more complex computation to resolve the touch locations.

Conventional two-layer XY matrix touchpad/touchscreen designs are typically arranged as two independent linear sliders, placed physically orthogonal to each other, and substantially filling a planar area. Using a centroid-processing algorithm to determine the peak in sensed capacitance, one slider is used to determine the X location of a finger touch and the second slider is used to determine the Y location of the touch. This is shown in FIG. 1A, where the single touch 101 represents the location of the operator's finger on the touchpad or touch screen.

FIG. 1A illustrates a detection profile 100 of a single touch 101 with the first type of conventional touchpad 110 noted above, as detected when scanning the rows and columns of an XY matrix. The location of the touch 101 on the Y-axis is determined from the calculated centroid of additional capacitance (e.g., 1st maximum 121) of the scanned rows in the matrix, and the location on the X-axis is determined from the calculated centroid of additional capacitance (e.g., 1st maximum 131) of the scanned columns of the same matrix. Conventional methods can be used to determine the location of a single finger anywhere on the touch screen.

When a second finger is placed on the touch sensitive area, this technique can still be applied, however, multiple restrictions apply. If the two fingers are on exactly the same axis (X or Y), the centroid algorithm can be modified to determine the location of two peaks on the alternate axis and thus report correct X/Y co-ordinates of both fingers. FIG. 1B shows an example of two fingers at different points on the X-axis, but on the same Y-axis co-ordinate. The same concept applies if both fingers are on the same X-axis co-ordinate but in different locations on the Y-axis. In both cases, the location of both fingers can be determined.

This sensing does have issues when the two touches share a common centroid peak, but are not on the exact same horizontal or vertical axis. When this happens, the shared capacitance peak tends to be slightly wider than that of a single touch, but a single centroid is calculated at some mathematical mean location between the two touches. The reported positions are no longer accurate for either touch when their exact location needs to be known.

Other problems arise when the second touch is on a different location on the X-axis and a different location on the Y-axis. FIG. 1C shows two different cases for the physical touch location of two fingers, but note that the centroid calculation produces the exact same result. Therefore, in this situation, the touch screen controller cannot determine exactly where the two fingers are located. The algorithm produces two possible results for two fingers, and multiple potential results for three fingers and even a possible 4-finger combination. For example, when a second touch 102 occurs, a second maximum (e.g., second maximum 122 and second maximum 132) is introduced on each axis, as shown in FIG. 1B. The second touch 102 possibly introduces two "ghost touch" locations 103, introducing multiple potential touch combinations.

From these dual-maxima, it is possible to infer the following as potential touch combinations that could generate the detected-touch response: two fingers, one on each of the black circles; two fingers, one on each of the hashed circles; three fingers, at any combination of the four circles (four possible combinations); four fingers, one at each circle. Of these seven possible combinations, it may not be possible to determine a) which of them is the present touch type, and b) (with the exception of the four finger combination) where the real touches are located.

A second type of conventional touchpad is composed of an XY array of independent sense elements, where each sensor element in a row or column is separately sensed. Here, each row and column is composed of multiple sensing elements, each capable of independent detection of a capacitive presence and magnitude. These may then be used to detect any number of substantially simultaneous touches. The drawback to this second type of conventional touchpad is the sheer number of elements that must be independently sensed, scanned, and evaluated for capacitive presence. For example, the first type of conventional touchpad including an array of ten by ten coupled sensor elements would require sensing and evaluation of twenty elements (ten rows and ten columns) to determine presence and location of touch. This same area, implemented as an all-points-addressable (APA) array (i.e., second type of conventional touchpad), would require one hundred evaluations (10×10=100) to also determine the location of a single touch, which is five times the number of the first type of conventional touchpad.

In addition to the processing and scanning time requirements of the second type of conventional touchpad, there is also the issue of physical routing. In an XY row/column arrangement, it is possible to use the sensing elements themselves as a significant part of the routing (at least for those parts occurring within the touch sensing area). With an APA array, each sensed location requires a separate wire or trace between the sensor element and the controller containing the capacitance sensing circuitry connected to the touchpad. In larger arrays, this can consume large routing resources. When implemented on transparent touch screens (where vias are not normally supported), it may not be physically possible to route all necessary sensor elements to the edge of the sensing grid to allow connection to a capacitance sensing controller.

One known solution to this second touch problem requires that the fingers do not hit the touch screen at the exact same instance in time. When the first finger is detected, its X/Y co-ordinate is calculated as usual. When the second finger touches, creating a second centroid on both axes, the centroid algorithms would generate two possible solutions as shown in FIG. 1C. However, since the location of the first finger is already known, the exact location of the second finger can be deduced. There are multiple drawbacks to this solution. For example, it is indeed possible that both fingers hit the touch screen at the exact same time. Also, since the row and column sensors are scanned sequentially, and given that each individual scan may take on the order of 1 millisecond (msec) or more, it is possible that the time taken to scan the entire touch screen and calculate the centroid could be as much as 20-30 msec. This can be thought of as the "sample" rate of the touch screen. Thus, even if the two fingers come into contact with the touch screen 30 msec apart, it is possible that they are recognized at the same time and appear to the touch screen controller as being truly simultaneous, and impossible to resolve. In addition, a third finger may be present that shares these same centroids and goes undetected. If, as the two touches are moved to perform a function, they ever line up to share a common axis, the orientation of the valid vs. invalid ("ghost") touches is lost. For this timing-based solution to work, the user must be educated to deliberately touch with one finger first and add the second finger after some delay. This presents a usability drawback.

BRIEF DESCRIPTION OF THE DRAWINGS

The present invention is illustrated by way of example, and not by way of limitation, in the figures of the accompanying drawings.

FIG. 5B illustrates one embodiment of a detection profile of two substantially simultaneous touches on the touch-sensor device of FIG. 5A.

FIG. 5C illustrates one embodiment of detection profile of two substantially simultaneous touches on the touch sensor device of FIG. 580 another embodiment of a detection profile of two substantially simultaneous touches on the touch-sensor device of FIG. 5A.

DETAILED DESCRIPTION

Figure 1A:
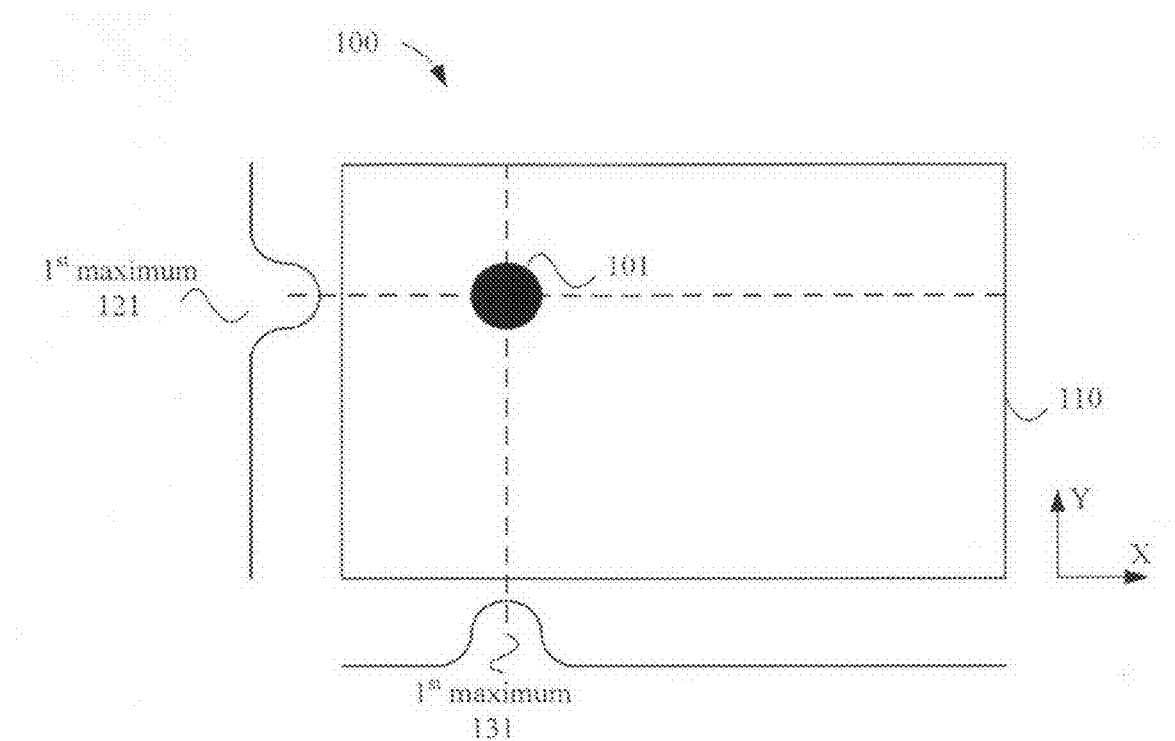
FIG. 1A illustrates a detection profile of a single touch with a first type of conventional touchpad.
Figure 1B:
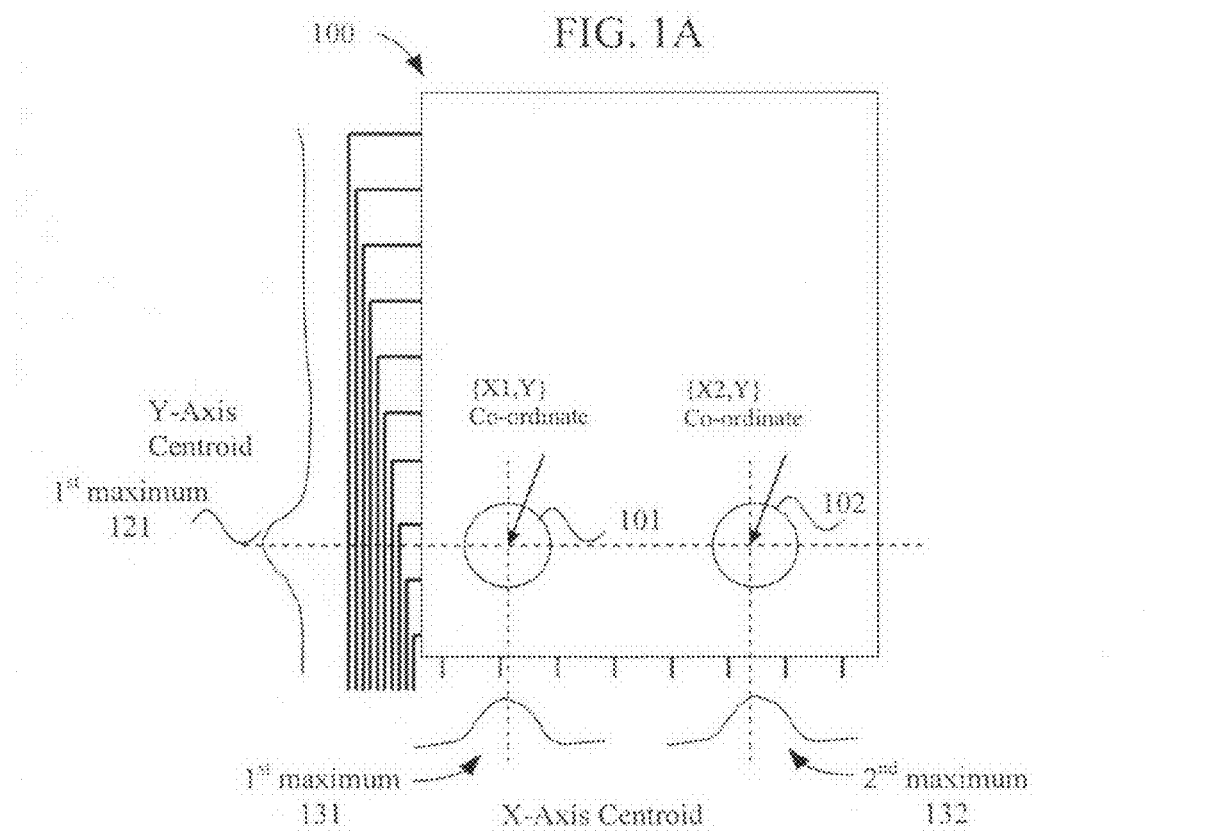
FIG. 1B illustrates a conventional touchpad with two touches at different points on the X-axis, but on the same Y-axis coordinate.

Described herein is a split touch-sensor device with multi-touch resolution. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of a method and an apparatus are described to detect and resolve locations of two or more substantially simultaneous touches on a split touch-sensor device, in addition to detecting and resolving single touches and substantially sequential touches on the touch-sensor device. In one embodiment, the method includes detecting multiple substantially simultaneous touches on a touch-sensor device having multiple sections in at least one dimension of the touch-sensor device, and resolving locations of the multiple substantially simultaneous touches on the touch-sensor device without an all-points-addressable (APA) array, as described below. Resolving the multiple locations includes resolving a first location in a first section of the multiple sections and resolving a second location in a second section that is adjacent to the first section of the touch-sensor device. In one embodiment, the apparatus includes a first set of sensor elements disposed in a first axis in a plane of a touch-sensor device, and a second set of sensor elements and a third set of sensor elements disposed in a second axis in approximately the same plane. It should be noted that in a multi-layer ITO (indium tin oxide) or similar transparent conductor construction, each axis is normally on a separate substrate, and thus, not on the exact same plane, however, they will be very close to the same plane (e.g., less than 1 mm). The second set of sensor elements is disposed in a first section of the touch-sensor device and the third set of sensor elements is disposed in a second section of the touch-sensor device that is adjacent to the first section. The first set, second set, and third set of sensor elements are configured to be separately scanned to detect a presence of one or more conductive objects on the touch-sensor device. The apparatus may further include a processing device coupled to the first, second, and third sets of sensor elements to detect a presence of one or more conductive objects on the touch-sensor device and to resolve multiple locations of multiple substantially simultaneous touches on the touch-sensor device without an APA array of sensor elements in the touch-sensor device.

In one embodiment, the touch-sensor device is split into two sections in one axis. In another embodiment, the touch-sensor device is split into three or more sections in one or more axes. Along any given side of a touch sensor device, for an XY matrix with connections along the periphery of said touch sensor device, there are no more than two sections along any one side. Splitting the touch-sensor device into three or more sections in one axis may not be possible in a touch screen, though it may be possible in a touch pad where additional routing layers or use of vias are possible, as described herein. In another embodiment, the touch-sensor device is split into four sections. In another embodiment, the touch-sensor device is split into three or more sections in two or more axes.

Figure 8A:
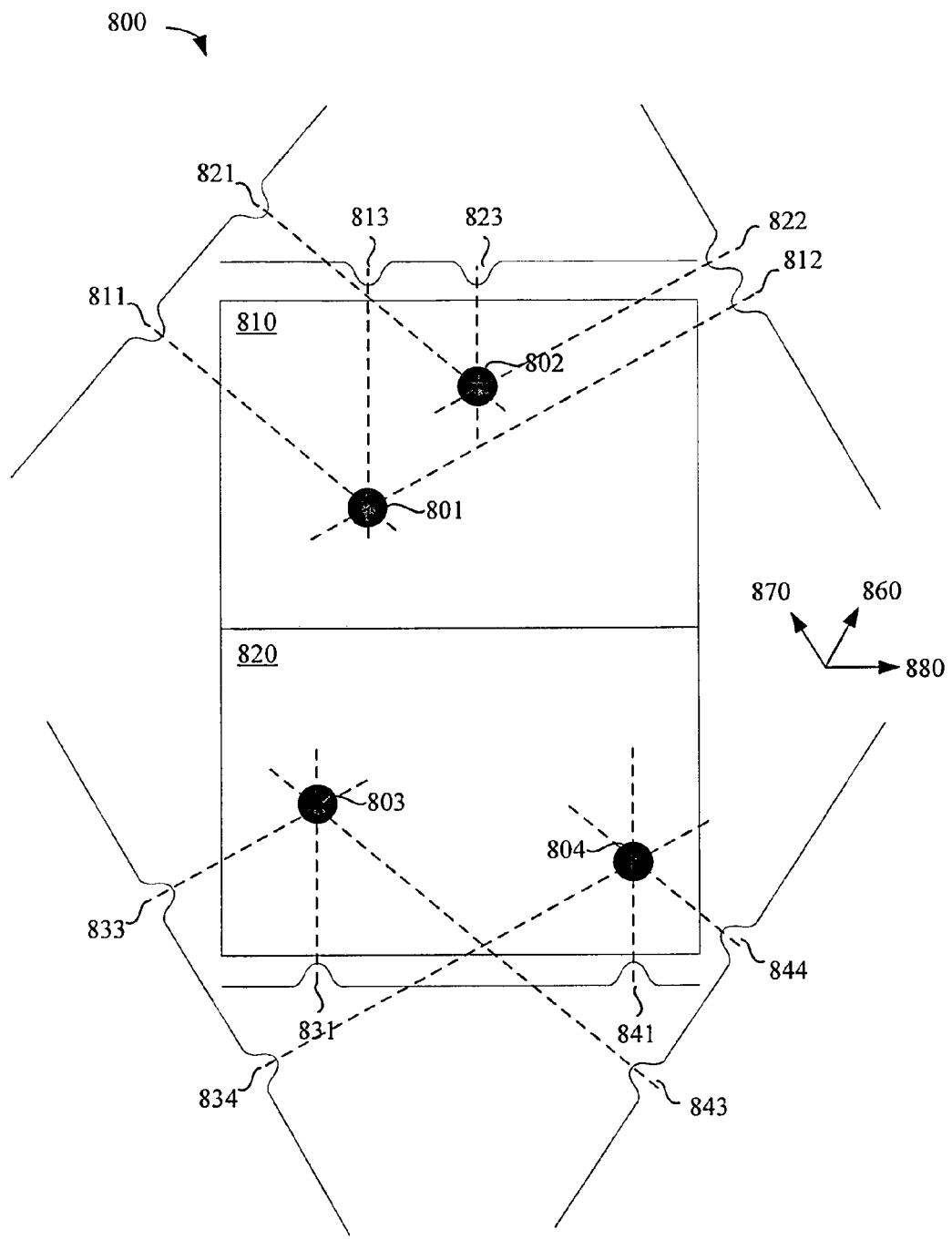
FIG. 8A illustrates one embodiment of a detection profile of two touches on each section of a split touch-sensor device using tri-axial sensing.

In another embodiment, each section can be configured to detect and resolve two or more substantially simultaneous touches on the section using a multiple-axis configuration of three or more axes of sensor elements, as described below. Multi-axial touch-sensor devices with multi-touch resolution, as described herein, include the capability to detect and resolve locations of two or more substantially simultaneous touches in each section. For example, in one embodiment, the apparatus further includes additional groups of sensor elements disposed on the diagonal axes in the plane of the touch-sensor device. The first, second, third, fourth, fifth, and sixth sets of sensor elements are separately scanned to detect the presence of one or more conductive objects on either of the first and second sections, and to resolve up to two locations, if any, on each of the first and second sections using the six sets of sensor elements disposed in three axes. In this embodiment, the tri-axial sensing (illustrated in FIG. 8B) has vertical sensing axis (columns) that is split across the shown horizontal boundary, and both diagonal sets would need to be split to allow the panel to be implemented as shown in FIG. 8A. Alternatively, other tri-axial sensing configurations are possible. For example, in another embodiment, in a hexagonal-shaped sensor element touch-sensor device, the six sets of sensor elements may be reduced to five sets of sensor elements by having two sets of diagonal sensors and a single set of horizontal sensors.

In one embodiment, the touch sensor device is a touchpad. Alternatively, the touch sensor device may be a touch screen or other types of touch sensitive user interface device, such as a touch-sensor slider, or the like.

From a theoretical standpoint, one can determine that with two axes (e.g., X and Y) arranged approximately orthogonal to each other, it is possible to resolve the location of one touch. A reason that a second touch may not be able to be resolved is that there can be insufficient information as to which potential locations are actual touches, and which are projections of something not really there (also referred to herein as "ghost" touches or points or invalid touches). In other words, two axes may be capable of detecting the presence of multiple touches, but may introduce ghost locations that keep the device from resolving the locations of all the touches.

As described above, conventional touch-sensor devices are designed to detect the presence and location of a single touch. And, as such, the conventional touch-sensor devices are not capable of resolving two or more substantially simultaneous touches on the touch-sensor device. Also, the conventional time-based solution also is not capable of resolving the two or more substantially simultaneous touches on the touch screen because the device requires that the fingers do not hit the touchpad at approximately the same instant in time.

The embodiments described herein allow the detection of multiple touches by segmenting the screen into multiple sections or zones, with each zone independently capable of detecting and resolving the location of one or more touches. In addition, the location information, obtained when a finger or touch transitions from one zone to another, may allow the intelligent removal of ghost points, that would otherwise cause ambiguity in the number of touches and touch location, when more than one finger is in the same zone.

Figure 5A:
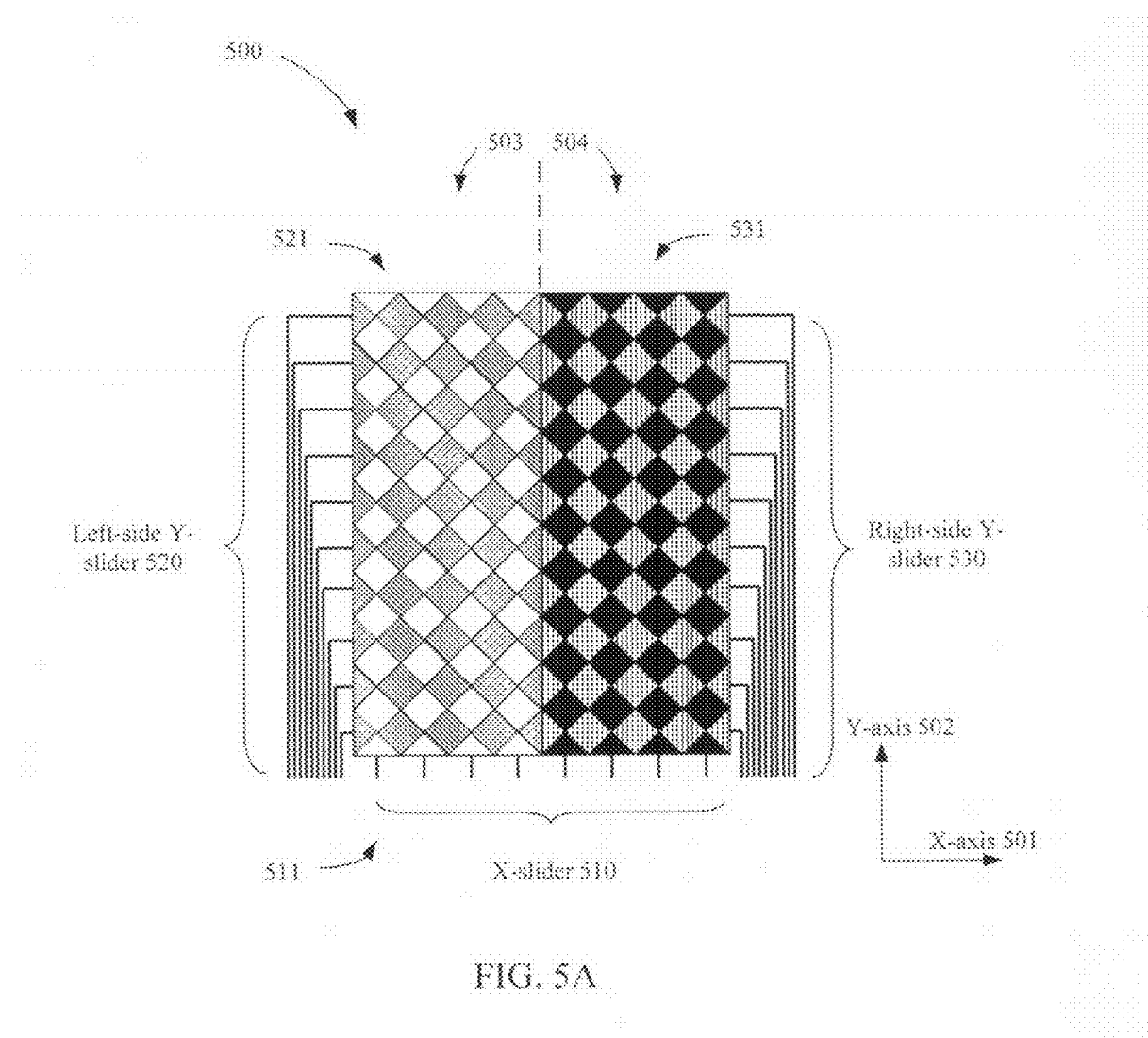
FIG. 5A illustrates one embodiment of a touch-sensor device having a first set of sensor elements disposed in a first axis and a second set and a third set of sensor elements disposed in a second axis.

The embodiments described herein solve at least some of the problems of the conventional devices and methods, as described above, by segmenting the touchpad or touch screen into multiple smaller sections or zones, with each zone being separately scanned from its neighbors. For example, as shown in FIG. 5A, the Y-axis sensor elements are broken up into two independent sliders: one for the left side of the touch screen and another for the right side. In such a touch screen, it is assumed that the size of the touch screen is small enough (for example, 2.4-3.0 inches for a cell phone display) that it would not be probable that both the user's fingers would be present entirely within the same semi-slider. If they were, the same diagonal touch ambiguity would exist in the previous examples. Based on this assumption, the split screen approach eliminates the diagonal touch ambiguity previously described. In this example, the touch screen could have an X-axis slider having eight contiguous columns of multiple sensors, and a right-side, Y-axis slider and a left-side, Y-axis slider that each has ten contiguous rows of multiple sensors. In another embodiment, the eight-segmented X-axis slider may operate as an eight-segmented X-slider in a normal mode and switch to two four-segmented X-sliders (right-side, X-axis slider and left-side, X-axis slider) in a multi-touch mode.

An XY touch-sensor device split in two can resolve two touches. A similar touch-sensor device split in three can resolve three touches, and a panel split in four can resolve four touches. This assumes that each touch originates in a section of the overall touch-sensor device with no other touches in that section. Splits beyond 4-way may be more challenging to implement for touch screens, due to the need to have access to the row and column signals at the edge of the touch-sensor device.

Each section of the touch-sensor device can also be scanned and sensed separately from the others, allowing some level of parallel sensing to occur. When a touch screen touch-sensor device is split, the resistance of the rows or columns that are split is significantly reduced (e.g., by half if split in the center). This either allows improved signal to noise margin in sensing, allows the touch-sensor device to be made with thinner ITO to improve light transmission, or allows a larger overall touch-sensor device to be constructed and sensed. For example, if a controller can sense a pattern with a maximum length of 5 inches, a split panel form could extend this size to 10 inches.

The disadvantage of this implementation is that it may use additional connections to the capacitance sensing controller, but this implementation may still be advantageous because no additional layers of conductive material (e.g., Indium Tin Oxide (ITO) or Poly(3,4-ethylenedioxythiophene) (PEDOT)) are needed, which makes the construction of this implementation no more complex than a standard two-layer XY matrix touch screen.

Described herein are embodiments of a split touch-sensor device that can independently scan multiple sections of the split touch-sensor device. The touch-sensor device is segmented into multiple zones or sections to allow resolution of multiple substantially simultaneous touches on the touch-sensor device without an APA array of sensor elements and possibly without additional conductive layers. The embodiments described herein can resolve two or more substantially simultaneous touches without using timing of events to remove invalid touches.

Figure 8B:
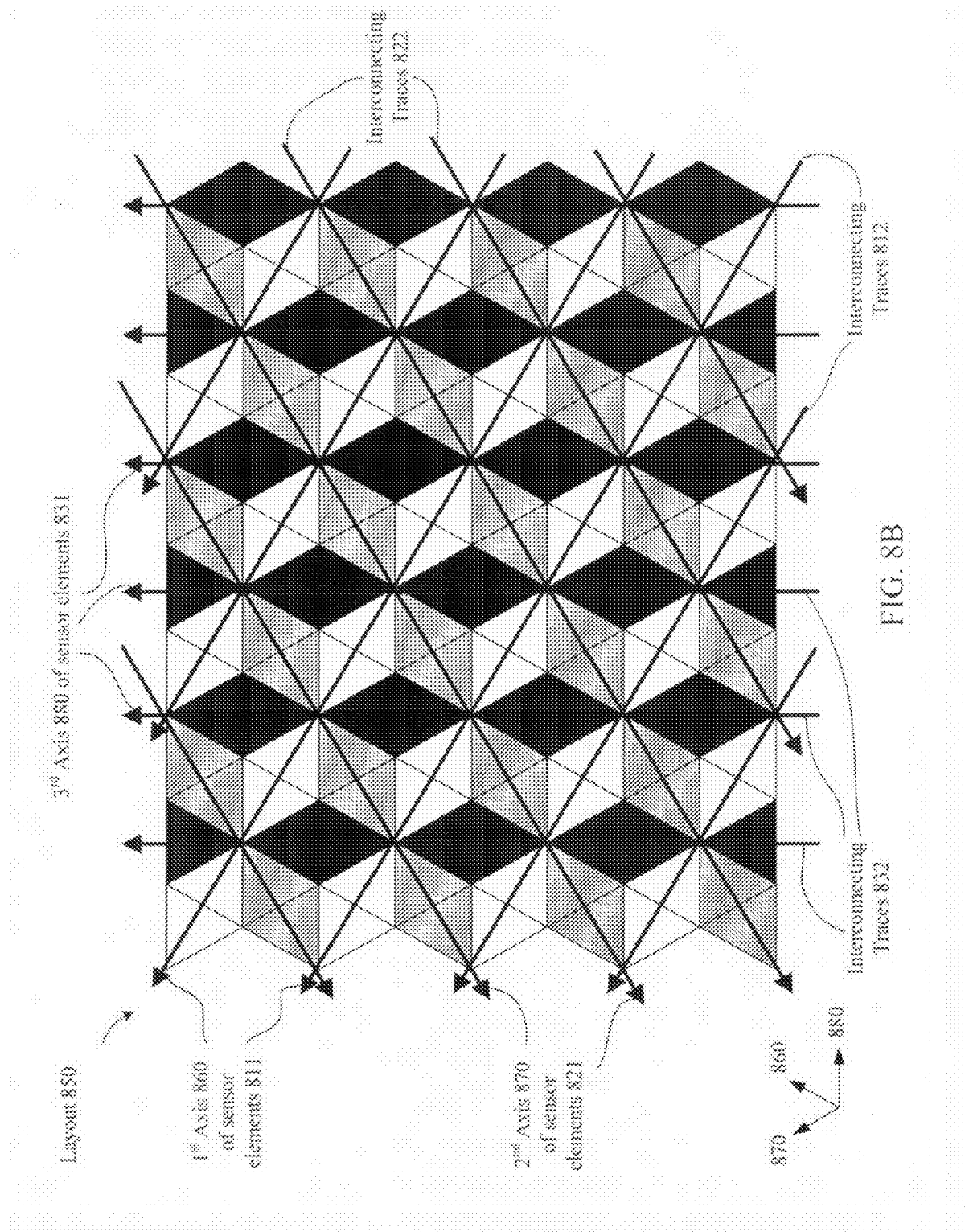
FIG. 8B illustrates one embodiment of a layout for diamond-based tri-axial sensing in a section of the split touch-sensor device of FIG. 8A.

Advantages of embodiments of the present invention may include one or more of the following: improved resolution of multi-touch sensor devices, multi-axial scanning (e.g., three or more axes) which improves the spatial resolution of the detected location; the ability to resolve the location of two or more substantially simultaneous touches without the use of an APA array; and tri-axial sensing layouts for low and high sheet-resistance material. It should be noted that only the high sheet-resistance layout is shown in FIG. 8B.

The term sheet-resistance, as used herein, refers to how strongly a conductive material opposes the flow of electrical current. The sheet resistance of the material is measured in ohms per square. The higher the sheet-resistance of the conductive materials used to make the capacitance sensing elements, the greater the resistance of these sensing elements once the material has been patterned to make the capacitive sensing elements. For example, in the sub-micron thicknesses normally used for touch screens, Indium Tin Oxide (ITO), which is a transparent ceramic conductor, has a nominal sheet-resistance of from 100 to 1000 ohms/square, copper in the nominal plating ways used on circuit boards for touch pads has a sheet-resistance of less than one ohms/square, and Poly(3,4-ethylenedioxythiophene) poly(styrenesulfonate) (PEDOT:PSS) has a nominal sheet-resistance range of 0.5 to 30 kohms/square. It should be noted that sheet-resistance, as a parameter, is related to the conductivity of the specific element or compound, and to its applied thickness, which results in a wide range of values for each of these materials.

Figure 2:
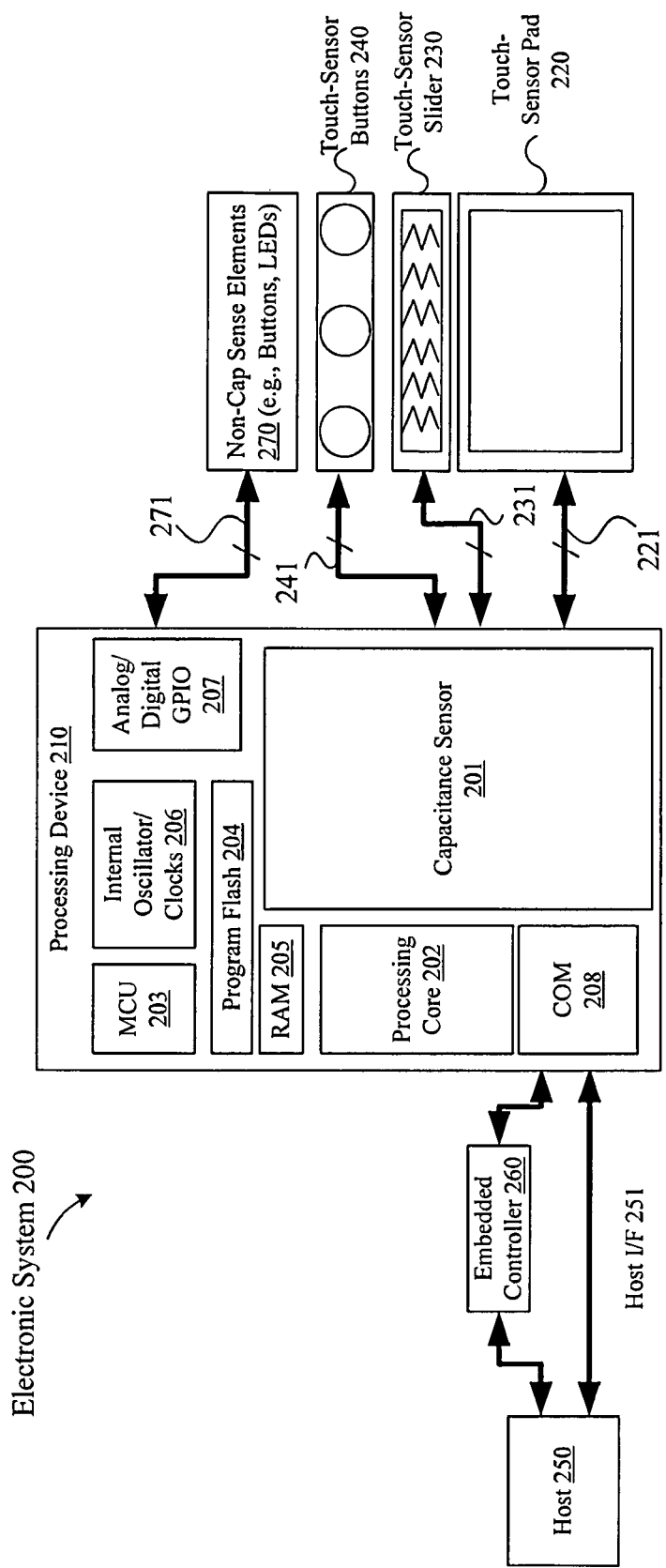
FIG. 2 illustrates a block diagram of one embodiment of an electronic system having a processing device for detecting a presence of a conductive object.

FIG. 2 illustrates a block diagram of one embodiment of an electronic system having a processing device for detecting a presence of a conductive object. Electronic system 200 includes processing device 210, touch-sensor pad 220, touch-sensor slider 230, touch-sensor buttons 240, host processor 250, embedded controller 260, and non-capacitance sensor elements 270. The processing device 210 may include analog and/or digital general purpose input/output ("GPIO") ports 207. GPIO ports 207 may be programmable. GPIO ports 207 may be coupled to a Programmable Interconnect and Logic ("PIL"), which acts as an interconnect between GPIO ports 207 and a digital block array of the processing device 210 (not illustrated). The digital block array may be configured to implement a variety of digital logic circuits (e.g., DAC, digital filters, digital control systems) using, in one embodiment, software or firmware in the form of configurable user modules ("UMs"). The digital block array may be coupled to a system bus (not illustrated). Processing device 210 may also include memory, such as random access memory (RAM) 205 and program flash 204. RAM 205 may be static RAM (SRAM) or the like, and program flash 204 may be a non-volatile storage, or the like, which may be used to store firmware (e.g., control algorithms executable by processing core 202 to implement operations described herein). Processing device 210 may also include a memory controller unit (MCU) 203 coupled to memory and the processing core 202.

The processing device 210 may also include an analog block array (not illustrated). The analog block array is also coupled to the system bus. Also, the analog block array may be configured to implement a variety of analog circuits (e.g., ADC, analog filters) using, in one embodiment, configurable UMs. The analog block array may also be coupled to the GPIO 207.

As illustrated, capacitance sensor 201 may be integrated into processing device 210. Capacitance sensor 201 may include analog I/O for coupling to an external component, such as touch-sensor pad 220, touch-sensor slider 230, touch-sensor buttons 240, and/or other devices. Capacitance sensor 201 and processing device 210 are described in more detail below.

It should also be noted that the embodiments described herein may be implemented in sensing technologies other than capacitive sensing, such as resistive, optical imaging, surface acoustical wave (SAW), infrared, dispersive signal, strain gauge technologies, or the like. Similarly, the operations described herein are not limited to notebook pointer operations, but can include other operations, such as lighting control (dimmer), temperature or environmental control, volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition and numeric keypad operation.

In one embodiment, the electronic system 200 includes a touch-sensor pad 220 coupled to the processing device 210 via bus 221. Touch-sensor pad 220 may include a two-dimension sensor array. The two-dimension sensor array includes multiple sensor elements, organized as rows and columns. In another embodiment, the electronic system 200 includes a touch-sensor slider 230 coupled to the processing device 210 via bus 231. Touch-sensor slider 230 may include a single-dimension sensor array. The single-dimension sensor array includes multiple sensor elements, organized as rows, or, as columns, or alternatively, as radial elements. In another embodiment, the electronic system 200 includes touch-sensor buttons 240 coupled to the processing device 210 via bus 241. Touch-sensor buttons 240 may include a single-dimension or multi-dimension sensor array. The single- or multi-dimension sensor array may include multiple sensor elements. For touch-sensor buttons, touch-sensor sliders, or an n-dimensional touch sensor array, the sensor elements may be coupled together to detect a presence of a conductive object over the entire surface of the sensing device. Alternatively, the touch-sensor button 240 has a single sensor element to detect the presence of the conductive object. In one embodiment, the touch-sensor button 240 may be a capacitance sensor element. Capacitance sensor elements may be used as non-contact sensors. These sensor elements, when protected by an insulating layer, offer resistance to severe environments.

The electronic system 200 may include any combination of one or more of the touch-sensor pad 220, touch-sensor slider 230, and touch-sensor button 240. In another embodiment, the electronic system 200 may also include non-capacitance sensor elements 270 coupled to the processing device 210 via bus 271. The non-capacitance sensor elements 270 may include buttons, light emitting diodes (LEDs), and other user interface devices, such as a mouse, a keyboard, a display, or other functional keys that do not require capacitance sensing. In one embodiment, buses 271, 241, 231, and 221 may be a single bus. Alternatively, these buses may be configured into any combination of one or more separate buses.

The processing device 210 may also provide value-added functionality such as keyboard control integration, LEDs, battery charger, and general purpose I/O, as illustrated as non-capacitance sensor elements 270. Non-capacitance sensor elements 270 are coupled to the GPIO 207.

Processing device 210 may include internal oscillator/clocks 206 and communication block 208. The oscillator/clocks block 206 provides clock signals to one or more of the components of processing device 210. Communication block 208 may be used to communicate with an external component, such as a host processor 250, via host interface (I/F) 251. Alternatively, the processing device 210 may also be coupled to embedded controller 260 to communicate with the external components, such as host 250. Interfacing to the host 250 can be through various methods. In one exemplary embodiment, interfacing with the host 250 may be done using a standard PS/2 interface to connect to an embedded controller 260, which in turn sends data to the host 250 via a low pin count (LPC) interface. In some instances, it may be beneficial for the processing device 210 to do both sensing device and keyboard control operations, thereby freeing up the embedded controller 260 for other housekeeping functions. In another exemplary embodiment, interfacing may be done using a universal serial bus (USB) interface directly coupled to the host 250 via host interface 251. Alternatively, the processing device 210 may communicate to external components, such as the host 250 using industry standard interfaces, such as USB, PS/2, inter-integrated circuit (I2C) bus, Serial Peripheral Interface (SPI), or the like. The host 250 and/or embedded controller 260 may be coupled to the processing device 210 with a rigid ribbon, or flex cable from an assembly, which houses the sensing device and processing device.

In one embodiment, the processing device 210 is configured to communicate with the embedded controller 260 or the host 250 to send and/or receive data. The data may be a command or alternatively a signal. Alternatively, the processing device 210 may be configured to communicate with the embedded controller 260 or the host 250, using non-OS drivers, such as dedicated touch-sensor pad drivers, or other drivers known by those of ordinary skill in the art.

In one embodiment, the processing device 210 may operate to communicate data (e.g., commands or signals) using hardware, software, and/or firmware, and the data may be communicated directly to the processing device of the host 250, such as a host processor, or alternatively, may be communicated to the host 250 via drivers of the host 250, such as OS drivers, or other non-OS drivers. It should also be noted that the host 250 may communicate directly with the processing device 210 via host interface 251.

Processing device 210 may reside on a common carrier substrate such as, for example, an integrated circuit (IC) die substrate, a multi-chip module substrate, or the like. Alternatively, the components of processing device 210 may be one or more separate integrated circuits and/or discrete components. In one exemplary embodiment, processing device 210 may be the Programmable System on a Chip (PSoC®) processing device, developed by Cypress Semiconductor Corporation, San Jose, Calif. Alternatively, processing device 210 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s).

It should also be noted that the embodiments described herein are not limited to having a configuration of a processing device coupled to a host, but may include a system that measures the capacitance on the sensing device and sends the raw data to a host computer where it is analyzed by an application. In effect the processing that is done by processing device 210 may also be done in the host. In another embodiment, the processing device 210 is the host.

Embodiments of the method and apparatus described herein may be implemented in a fully self-contained sensing device, which outputs fully processed X/Y movement and gesture data signals or data commands to a host. In another embodiment, the method and apparatus may be implemented in a sensing device, which outputs X/Y movement data and also finger presence data to a host, and where the host processes the received data to detect gestures. In another embodiment, the method and apparatus may be implemented in a sensing device, which outputs raw capacitance data to a host, where the host processes the capacitance data to compensate for quiescent and stray capacitance, and calculates X/Y movement and detects gestures by processing the capacitance data. Alternatively, the method and apparatus may be implemented in a sensing device, which outputs pre-processed capacitance data to a host, where the sensing device processes the capacitance data to compensate for quiescent and stray capacitance, and the host calculates X/Y movement and detects gestures from the pre-processed capacitance data. Alternatively, other configurations are possible.

The electronic system that includes the embodiments described herein may be implemented in a touch-sensor pad of a conventional laptop (e.g., notebook computer). Alternatively, it may be implemented in a wired or wireless keyboard integrating a touch-sensor pad, which is itself connected to a host. Alternatively, it may be implemented as a transparent touch screen. Alternatively, the embodiments may be implemented in a mobile handset (e.g., cellular or mobile phone) or other electronic devices where the touch-sensor pad or touch-sensor screen may operate in one of two or more modes. For example, the touch-sensor pad may operate either as a touch-sensor pad for x/y positioning and gesture recognition, or as a keypad or other arrays of touch-sensor buttons and/or sliders. Alternatively, the touch-sensor pad, although configured to operate in the two modes, may be configured to be used only as a keypad, or only as a touch-sensor pad. Alternatively, the electronic device may be used in other applications, such as a personal data assistant (PDA), a kiosk, a keyboard, a television, a remote control, a monitor, a handheld multi-media device, a handheld video player, a handheld gaming device, or a control panel.

Capacitance sensor 201 may be integrated into the processing device 210, or alternatively, in a separate IC. Alternatively, descriptions of capacitance sensor 201 may be generated and compiled for incorporation into other integrated circuits. For example, behavioral level code describing capacitance sensor 201, or portions thereof, may be generated using a hardware description language, such as VHDL or Verilog, and stored to a computer-accessible medium (e.g., Flash ROM, CD-ROM, hard disk, floppy disk, etc.). Furthermore, the behavioral level code can be compiled into a netlist, or even a circuit layout and stored to a computer-accessible medium. The behavioral level code, the netlist, and the circuit layout all represent various levels of abstraction to describe capacitance sensor 201.

It should be noted that the components of electronic system 200 may include all the components described above. Alternatively, electronic system 200 may include only some of the components described above, or include additional components not listed herein.

In one embodiment, electronic system 200 is implemented in a device that includes a touch-sensor device for the user interface, such as handheld electronics, portable telephones, cellular telephones, notebook computers, personal data assistants (PDAs), kiosks, keyboards, televisions, remote controls, monitors, handheld multi-media devices, handheld video players, gaming devices, control panels of a household or industrial appliances, or the like. Alternatively, the electronic system 200 may be used in other types of devices.

In one embodiment, capacitance sensor 201 is based on a capacitance sensing relaxation oscillator (CSR), as described below with respect to FIG. 3C. The CSR may be coupled to an array of sensor elements using a current-programmable relaxation oscillator, an analog multiplexer, digital counting functions, and high-level software routines to compensate for environmental and physical sensor element variations. The sensor array may include combinations of independent sensor elements. The CSR may include physical, electrical, and software components. The physical component may include the physical sensor elements themselves, typically a pattern of conductive elements constructed on a PCB with an insulating cover, a flexible membrane, or a transparent overlay. The electrical component may include an oscillator or other means to convert a capacitance into a measured value. The electrical component may also include a counter or timer to measure the oscillator output. The software component may include detection and compensation algorithms to convert the count value (e.g., capacitance value) into a sensor element detection decision (also referred to as switch detection decision) or relative magnitude.

It should be noted that there are various known methods for measuring capacitance. Although some embodiments described herein are described using a relaxation oscillator, the present embodiments are not limited to using relaxation oscillators, but may include other methods, such as current versus voltage phase shift measurement, resistor-capacitor charge timing, capacitive bridge divider, charge transfer, successive approximation, sigma-delta modulators (illustrated below with respect to FIG. 3D), charge-accumulation circuits, field effect, mutual capacitance, frequency shift, or the like. It should be noted however, instead of evaluating the raw counts relative to a threshold, the capacitance sensor may be evaluating other measurements to determine the user interaction. For example, in the capacitance sensor having a sigma-delta modulator, the capacitance sensor is evaluating the ratio of pulse widths of the output, instead of the raw counts being over a certain threshold.

The current versus voltage phase shift measurement may include driving the capacitance through a fixed-value resistor to yield voltage and current waveforms that are out of phase by a predictable amount. The drive frequency can be adjusted to keep the phase measurement in a readily measured range.

The resistor-capacitor charge timing may include charging the capacitor through a fixed resistor and measuring timing on the voltage ramp. Small capacitance values may require very large resistors for reasonable timing. The capacitive bridge divider may include driving the capacitor under test through a fixed reference capacitor. The reference capacitor and the capacitor under test form a voltage divider. The voltage signal may be recovered with a synchronous demodulator, which may be done in the processing device 210. The charge transfer may be conceptually similar to an R-C charging circuit. In this method, $C_F$ is the capacitance being sensed. CSUM is the summing capacitor, into which charge is transferred on successive cycles. At the start of the measurement cycle, the voltage on CSUM is discharged. The voltage on CSUM increases exponentially (and only slightly) with each clock cycle. The time for this voltage to reach a specific threshold is measured with a counter. Additional details regarding these alternative embodiments have not been included so as to not obscure the present embodiments, and because these alternative embodiments for measuring capacitance are known by those of ordinary skill in the art.

Figure 3A:
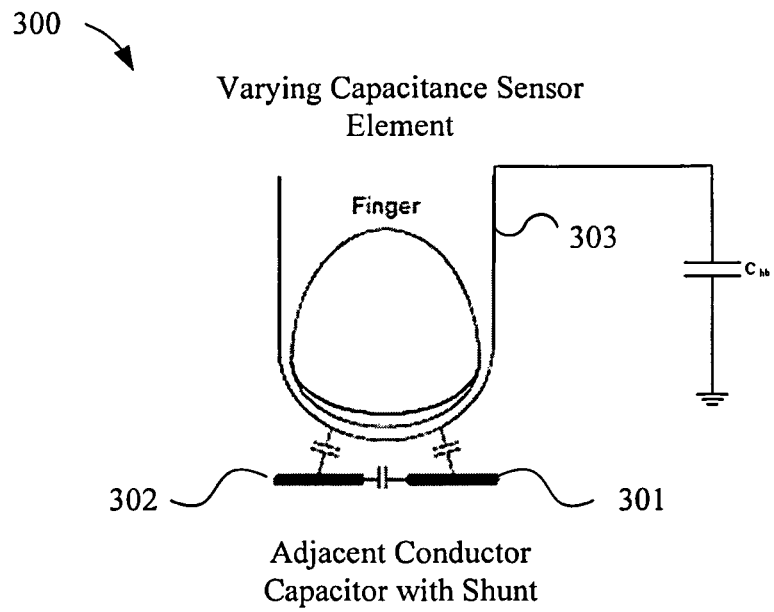
FIG. 3A illustrates a varying capacitance sensor element.

FIG. 3A illustrates a varying capacitance sensor element. In its basic form, a capacitance sensor element 300 is a pair of adjacent conductors 301 and 302. There is a small edge-to-edge capacitance, but the intent of sensor element layout is to minimize the parasitic capacitance $C_P$ between these conductors. When a conductive object 303 (e.g., finger) is placed in proximity to the two conductors 301 and 302, there is a capacitance between electrode 301 and the conductive object 303 and a similar capacitance between the conductive object 303 and the other electrode 302. The capacitance between the electrodes when no conductive object 303 is present is the base capacitance $C_P$ that may be stored as a baseline value. The capacitance value $C_F$ represents the capacitance from conductor 301 to conductive object 303 then to conductor 302. There is also a total capacitance ($C_P+C_F$) on the sensor element 300 when the conductive object 303 is present on or in close proximity to the sensor element 300. The baseline capacitance value $C_P$ may be subtracted from the total capacitance when the conductive object 303 is present to determine the change in capacitance (e.g., capacitance variation $C_F$) when the conductive object 303 is present and when the conductive object 303 is not present on the sensor element. Effectively, the capacitance variation $C_F$ can be measured to determine whether a conductive object 303 is present or not (e.g., sensor activation) on the sensor element 300. In the case of the finger as a conductive object 303, the conductive object 303 is usually grounded via the human body's capacitance to ground. In this case, the conductive surface of the sensor element is physically and electrically isolated from the grounded human body connection. The $C_P$ connection can be modeled two different ways and may make a significant difference in sensitivity.

Capacitance sensor element 300 may be used in a capacitance sensor array. The capacitance sensor array is a set of capacitors where one side of each capacitor is connected to a system ground. When the capacitance sensor element 300 is used in the sensor array, when the conductor 301 is sensed, the conductor 302 is connected to ground, and when the conductor 302 is sensed, the conductor 301 is connected to ground. Alternatively, when the sensor element is used for a touch-sensor button, the sensor element is sensed and the sensed button area may be surrounded by a fixed ground. The presence of the conductive object 303 increases the capacitance ($C_P+C_F$) of the sensor element 300 to ground. Determining sensor element activation is then a matter of measuring change in the capacitance ($C_F$) or capacitance variation. Sensor element 300 is also known as a grounded variable capacitor.

The conductive object 303 in this embodiment has been illustrated as a finger. Alternatively, this technique may be applied to any conductive object, for example, a conductive door switch, position sensor, or conductive pen in a stylus tracking system (e.g., stylus).

Figure 3B:
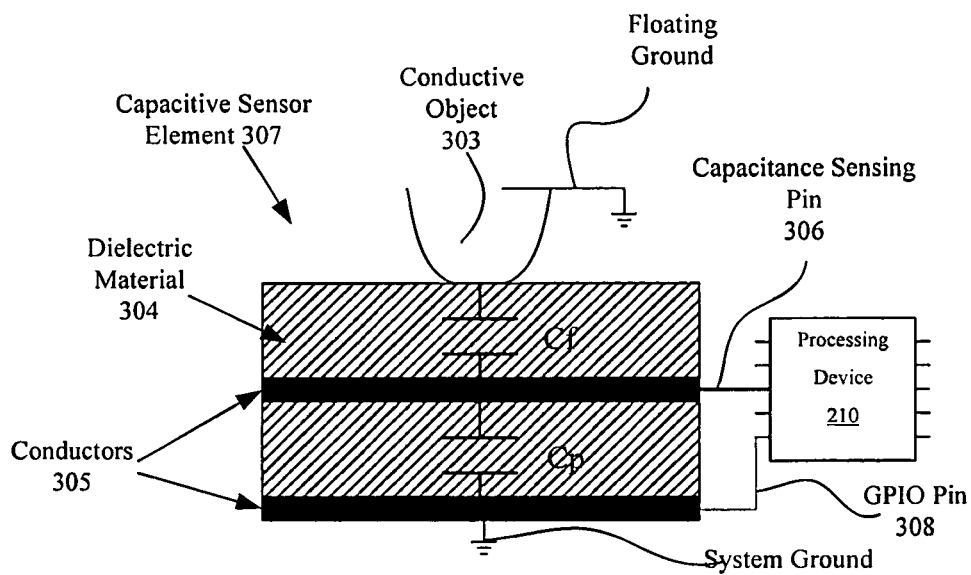
FIG. 3B illustrates one embodiment of a sensing device coupled to a processing device.

FIG. 3B illustrates one embodiment of a capacitance sensor element 307 coupled to a processing device 210. Capacitance sensor element 307 illustrates the capacitance as seen by the processing device 210 on the capacitance sensing pin 306. As described above, when a conductive object 303 (e.g., finger) is placed in proximity to one of the conductors 305, there is a capacitance, $C_F$, between the one of the conductors 305 and the conductive object 303 with respect to ground. This ground, however, may be a floating ground. Also, there is a capacitance, $C_P$, between the conductors 305, with one of the conductors 305 being connected to a system ground. The grounded conductor may be coupled to the processing device 210 using GPIO pin 308. The conductors 305 may be metal, or alternatively, the conductors may be conductive ink (e.g., carbon ink, silver ink), conductive ceramic (e.g., transparent conductors of ITO), conductive polymers, or the like. In one embodiment, the grounded conductor may be an adjacent sensor element that is grounded while the capacitance on the neighboring sensor element is measured. Alternatively, the grounded conductor may be other grounding mechanisms, such as a surrounding ground plane. Accordingly, the processing device 210 can measure the change in capacitance, capacitance variation $C_F$, as the conductive object 303 is in proximity to one of the conductors 305. Above and below the conductor that is closest to the conductive object 303 is dielectric material 304. The dielectric material 304 above the conductor 305 can be an overlay. The overlay may be non-conductive material used to protect the circuitry from environmental conditions and electrostatic discharge (ESD), and to insulate the user's finger (e.g., conductive object 303) from the circuitry. Capacitance sensor element 307 may be a sensor element of a touch-sensor pad, a touch-sensor slider, a touch-sensor button, a touch-sensor screen, or the like.

Figure 3C:
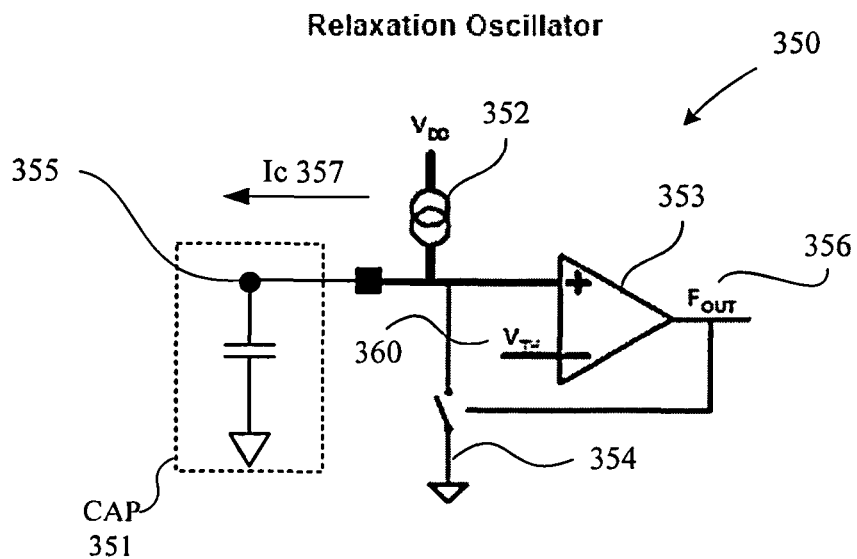
FIG. 3C illustrates one embodiment of a relaxation oscillator for measuring capacitance on a sensor element.

FIG. 3C illustrates one embodiment of a relaxation oscillator. The relaxation oscillator 350 is formed by the capacitance to be measured on capacitor 351, a charging current source 352, a comparator 353, and a reset switch 354 (also referred to as a discharge switch). It should be noted that capacitor 351 is representative of the capacitance measured on a sensor element of a sensor array. The relaxation oscillator is coupled to drive a charging current (Ic) 357 in a single direction onto a device under test ("DUT") capacitor, capacitor 351. As the charging current accumulates charge on the capacitor 351, the voltage across the capacitor increases with time as a function of Ic 357 and its capacitance C. Equation (1) describes the relation between current, capacitance, voltage, and time for a charging capacitor.

$$CdV=I_C dt \qquad (1)$$

The relaxation oscillator begins by charging the capacitor 351, at a fixed current Ic 357, from a ground potential or zero voltage until the voltage across the capacitor 351 at node 355 reaches a reference voltage or threshold voltage, $V_{TH}$ 360. At the threshold voltage $V_{TH}$ 360, the relaxation oscillator allows the accumulated charge at node 355 to discharge (e.g., the capacitor 351 to "relax" back to the ground potential) and then the process repeats itself. In particular, the output of comparator 353 asserts a clock signal $F_{OUT}$ 356 (e.g., $F_{OUT}$ 356 goes high), which enables the reset switch 354. This discharges the capacitor at node 355 to ground and the charge cycle starts again. The relaxation oscillator outputs a relaxation oscillator clock signal ($F_{OUT}$ 356) having a frequency ($f_{RO}$) dependent upon capacitance C of the capacitor 351 and charging current Ic 357 of the form of equation (2).

$$f_{RO} = \frac{i}{C * V_{TH}} \tag{2}$$

The comparator trip time of the comparator 353 and reset switch 354 add a fixed delay. The output of the comparator 353 is synchronized with a reference system clock to guarantee that the reset time is long enough to completely discharge capacitor 351. This sets a practical upper limit to the operating frequency. For example, if capacitance C of the capacitor 351 changes, then $f_{RO}$ changes proportionally according to Equation (2). By comparing $f_{RO}$ of $F_{OUT}$ 356 against the frequency ($f_{REF}$) of a known reference system clock signal (REF CLK), the change in capacitance ΔC can be measured. This is typically done by counting the number (N) of REF CLKs in an integer number of $f_{RO}$ periods and storing the result as a digital count ($n_{RO}$), as in equations (3) and (4).

$$n_{RO} = \frac{N * f_{REF}}{f_{RO}} \tag{3}$$

$$n_{RO} = \frac{N * C * V_{TH} * f_{REF}}{i} \tag{4}$$

In one embodiment, a frequency counter may be coupled to receive relaxation oscillator clock signal ($F_{OUT}$ 356) and continuously monitor the frequency, and output a signal indicative of the difference Δf between the current frequency and a stored value indicative of a baseline capacitance.

In one exemplary embodiment, the relaxation oscillator 350 may be built using a programmable timer (e.g., 555 timer) to implement the comparator 353 and reset switch 354. Alternatively, the relaxation oscillator 350 may be built using other circuitry. Relaxation oscillators are known by those of ordinary skill in the art, and accordingly, additional details regarding their operation have not been included so as to not obscure the present embodiments.

The capacitor charging current for the relaxation oscillator 350 may be generated in a register programmable current output DAC (also known as IDAC). Accordingly, the current source 352 may be a current DAC or IDAC. The IDAC output current may be set by an 8-bit value provided by the processing device 210, such as from the processing core 202. The 8-bit value may be stored in a register, in memory, or the like.

In many capacitance sensor element designs, the two "conductors" (e.g., 301 and 302) of the sensing capacitor are actually adjacent sensor elements that are electrically isolated (e.g., PCB pads or traces), as indicated in FIG. 3A. Typically, one of these conductors is connected to a system ground. Layouts for touch-sensor slider (e.g., linear slide sensor elements) and sensing device applications have sensor elements that may be immediately adjacent. In these cases, all of the sensor elements that are not active may be connected to a system ground through the GPIO 207 of the processing device 210 dedicated to that pin. The actual capacitance between adjacent conductors may be small ($C_P$), but the capacitance of the active conductor (and its PCB trace back to the processing device 210) to ground, when detecting the presence of the conductive object 303, may be considerably higher ($C_P+C_F$). The capacitance of two parallel conductors is given by the following equation:

$$C = \varepsilon_0 \cdot \varepsilon_R \cdot \frac{A}{d} = \varepsilon_R \cdot 8.85 \cdot \frac{A}{d} pF \tag{5}$$

The dimensions of equation (5) are in meters. This is a very simple model of the capacitance. The reality is that there are fringing effects that substantially increase the sensor element-to-ground (and PCB trace-to-ground) capacitance.

There is some variation of sensor element sensitivity as a result of environmental factors. A baseline-update routine, which compensates for this variation, may be provided in the high-level APIs.

As described above with respect to the relaxation oscillator 350, when a finger or conductive object 303 is placed on or in proximity to the sensor element, the capacitance increases from $C_P$, to $C_P+C_F$ so the relaxation oscillator output signal 356 ($F_{OUT}$) decreases in frequency. The relaxation oscillator output signal 356 ($F_{OUT}$) may be fed to a digital counter for measurement. There are two methods for counting the relaxation oscillator output signal 356: frequency measurement and period measurement. Additional details of the relaxation oscillator and digital counter are known by those of ordinary skill in the art, and accordingly a detailed description regarding them has not been included. It should also be noted, that the embodiments described herein are not limited to using relaxation oscillators, but may include other sensing circuitry for measuring capacitance, such as current versus voltage phase shift measurement, resistor-capacitor charge timing, capacitive bridge divider, charge transfer, sigma-delta modulators, charge-accumulation circuits, field effect, mutual capacitance, or the like.

Figure 3D:
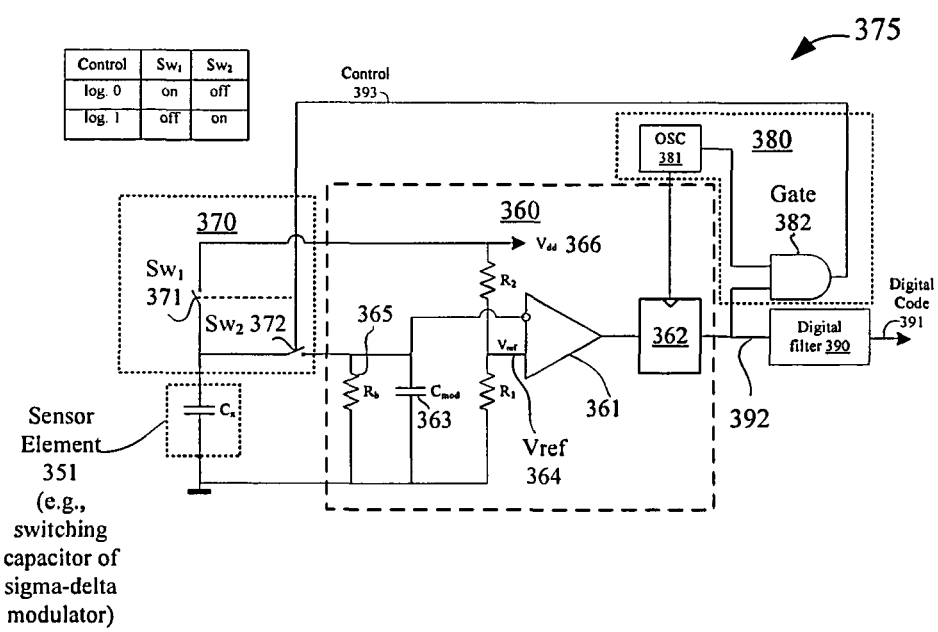
FIG. 3D illustrates a schematic of one embodiment of a circuit including a sigma-delta modulator and a digital filter for measuring capacitance on a sensor element.

FIG. 3D illustrates a schematic of one embodiment of a circuit 375 including a sigma-delta modulator 360 and a digital filter 390 for measuring capacitance on a sensor element 351. Circuit 375 includes a switching circuit 370, switching clock source 380, sigma-delta modulator 360, and digital filter 390 for measuring the capacitance on sensor element 351. Sensor element 351 may be a sensor element of a sensor array, and is represented as a switching capacitor $C_X$ in the modulator feedback loop. Alternatively, sensor element 351 may be a single sensor element, such as used in a touch-sensor button. Switching circuit 370 includes two switches $Sw_1$ 371 and $Sw_2$ 372. The switches $Sw_1$ 371 and $Sw_2$ 372 operate in two, non-overlapping phases (also known as break-before-make configuration). These switches together with sensing capacitor $C_X$ 351 form the switching capacitor equivalent resistor, which provides the modulator capacitor $C_{mod}$ 363 of sigma-delta modulator 360 charge current (as illustrated in FIG. 3D) or discharge current (not illustrated) during one of the two phases.

The sigma-delta modulator 360 includes the comparator 361, latch 362, modulator capacitor $C_{mod}$ 363, modulator feedback resistor 365, which may also be referred to as bias resistor 365, and voltage source 366. The output of the comparator may be configured to toggle when the voltage on the modulator capacitor 363 crosses a reference voltage 364. The reference voltage 364 may be a pre-programmed value, and may be configured to be programmable. The sigma-delta modulator 360 also includes a latch 362 coupled to the output of the comparator 361 to latch the output of the comparator 361 for a given amount of time, and provide as an output, output 392. The latch may be configured to latch the output of the comparator based on a clock signal from the gate circuit 382 (e.g., oscillator signal from the oscillator 381). In another embodiment, the sigma-delta modulator 360 includes a synchronized latch that operates to latch an output of the comparator for a pre-determined length of time. The output of the comparator may be latched for measuring or sampling the output signal of the comparator 361 by the digital filter 390.

Sigma-delta modulator 360 is configured to keep the voltage on the modulator capacitor 363 close to reference voltage $V_{ref}$ 364 by alternatively connecting the switching capacitor resistor (e.g., switches $Sw_1$ 371 and $Sw_2$ 372 and sensing capacitor $C_x$ 351) to the modulator capacitor 363. The output 392 of the sigma-delta modulator 360 (e.g., output of latch 362) is feedback to the switching clock circuit 380, which controls the timing of the switching operations of switches $Sw_1$ 371 and $Sw_2$ 372 of switching circuit 370. For example, in this embodiment, the switching clock circuit 380 includes an oscillator 381 and gate 382. Alternatively, the switching clock circuit 380 may include a clock source, such as a spread spectrum clock source (e.g., pseudo-random signal (PRS)), a frequency divider, a pulse width modulator (PWM), or the like. The output 392 of the sigma-delta modulator 360 is used with an oscillator signal to gate a control signal 393, which switches the switches $Sw_1$ 371 and $Sw_2$ 372 in a non-overlapping manner (e.g., two, non-overlapping phases). The output 392 of the sigma-delta modulator 360 is also output to digital filter 390, which filters and/or converts the output into the digital code 391.

In one embodiment of the method of operation, at power on, the modulator capacitor 363 has zero voltage and switching capacitor resistor (formed by sensing capacitor Cx 351, and switches $Sw_1$ 371 and $Sw_2$ 372) is connected between Vdd line 366 and modulator capacitor 363. This connection allows the voltage on the modulator capacitor 363 to rise. When this voltage reaches the comparator reference voltage, $V_{ref}$ 364, the comparator 361 toggles and gates the control signal 393 of the switches $Sw_1$ 371 and $Sw_2$ 372, stopping the charge current. Because the current via bias resistor $R_b$ 365 continues to flow, the voltage on modulator capacitor 363 starts to decrease. When the voltage decreases below the reference voltage 364, the output of the comparator 361 switches again, enabling the modulator capacitor 363 to start charging. The latch 362 and the comparator 361 set the sample frequency of the sigma-delta modulator 360.

The digital filter 390 is coupled to receive the output 392 of the sigma-delta modulator 360. The output 392 of the sigma-delta modulator 360 may be a single-bit bit-stream, which can be filtered and/or converted to numerical values using a digital filter 390. In one embodiment, the digital filter 390 is a counter. In another embodiment, a standard Sync digital filter can be used. In another embodiment, the digital filter is a decimator. Alternatively, other digital filters may be used for filtering and/or converting the output 392 of the sigma-delta modulator 360 to provide the digital code 391. It should also be noted that the output 392 may be output to the decision logic 402 or other components of the processing device 210, or to the decision logic 451 or other components of the host 250 to process the bit-stream output of the sigma-delta modulator 360.

Described below are the mathematical equations that represent the operations of FIG. 3D. During a normal operation mode, the sigma-delta modulator 360 keeps these currents substantially equal on average by keeping the voltage on the modulator 363 equal to, or close to, the reference voltage $V_{ref}$ 364. The current of the bias resistor $R_b$ 365 is:

$$I_{Rb} = \frac{V_{cmod}}{R_b} \quad (6)$$

The sensing capacitor $C_x$ 351 in the switched-capacitor mode has equivalent resistance:

$$R_c = \frac{1}{f_s C_x} \quad (7)$$

where $f_s$ is the operation frequency of the switches (e.g., switching circuit 370). If the output 392 of the sigma-delta modulator 360 has a duty cycle of $d_{mod}$, the average current of the switching capacitor 351 can be expressed in the following equation (8):

$$I_c = d_{mod} \frac{V_{dd} - V_{Cmod}}{R_c} \quad (8)$$

In the operation mode, $$I_{Rb} = I_c, \quad V_{Cmod} = V_{ref} \text{ or: } \frac{V_{ref}}{R_b} = d_{mod} \frac{V_{dd} - V_{ref}}{R_c} \quad (9)$$

or taking into account that the reference voltage 364 is part of supply voltage:

$$V_{ref} = k_d V_{dd}; \quad k_d = \frac{R_1}{R_1 + R_2} \quad (10)$$

The Equation (9) can be rewritten in the following form:

$$d_{mod} = \frac{R_c}{R_b} \frac{k_d}{1 - k_d} = \frac{1}{f_s R_b} \frac{k_d}{1 - k_d} \frac{1}{C_x} \quad (11)$$

The Equation (11) determines the minimum sensing capacitance value, which can be measured with the proposed method at given parameters set:

$$d_{mod} \leq 1, \text{ or: } C_{xmin} = \frac{1}{f_s R_b} \frac{k_d}{1 - k_d} \quad (12)$$

The resolution of this method may be determined by the sigma-delta modulator duty cycle measurement resolution, which is represented in the following equations:

$$\Delta d_{mod} = \beta \frac{\Delta C_x}{C_x^2}; \quad (13)$$

$$\beta = \frac{1}{f_s R_b} \frac{k_d}{1 - k_d}$$

or after rewriting relatively $\Delta C_x$, we obtain:

$$\Delta C_x = \frac{1}{\beta}\Delta d_{mod} C_x^2 \qquad (14)$$

In one exemplary embodiment, the resistance of the bias resistor 365 is 20 k ohms ($R_b$=20 k), the operation frequency of the switches is 12 MHz ($f_s$=12 MHz), the capacitance on the switching capacitor 351 is 15 picofarads ($C_x$=15 pF), and the ratio between Vdd 366 and the voltage reference 364 is 0.25 ($k_d$=0.25), the duty cycle has a 12-bit resolution and the capacitance resolution is 0.036 pF.

In some embodiments of capacitive sensing applications, it may be important to get fast data measurements. For example, the modulator can operate at sample frequency 10 MHz (period is 0.1 microseconds (μs)), for the 12-bit resolution sample, and digital filter as single-type integrator/counter the measurement time is approximately 410 μs (e.g., $2^{12}$* 0.1 μs=410 μs). For faster measurement speeds at the same resolution, other types of digital filters may be used, for example, by using the Sinc2 filter, the scanning time at the same resolution may be reduced approximately 4 times. Using this configuration, the sensing method should have suitable measurement speed. A good measurement rate may be accomplished by using a double integrator as the digital filter 390.

Figure 4:
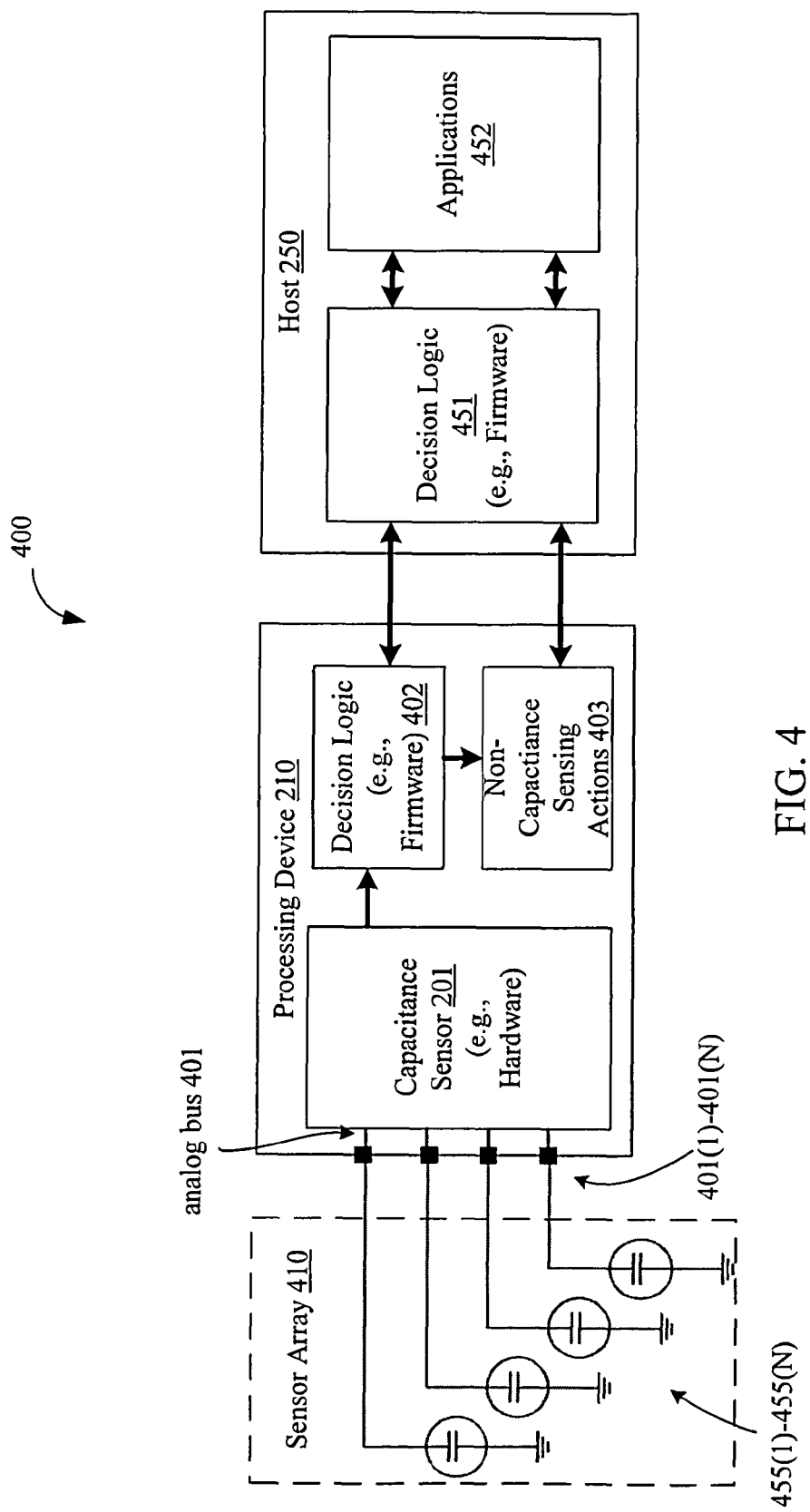
FIG. 4 illustrates a block diagram of one embodiment of an electronic device including a processing device that includes a capacitance sensor for measuring the capacitance on a sensor array.

FIG. 4 illustrates a block diagram of one embodiment of an electronic device 400 including a processing device 210 that includes a capacitance sensor 201 for measuring the capacitance on a sensor array 410. The electronic device 400 includes the sensor array 410, processing device 210, and host 250. The sensor array 410 may be a single set of sensor elements that are disposed in at least one dimension of the touch-sensor device. The sensor array 410 is coupled to pins 401(1)-401(N) of the processing device 210 via an analog bus 401 having multiple signals. Each sensor element is represented as a capacitor, as described above with respect to FIG. 3B. Sensor array 410 includes sensor elements 455(1)-455(N), where N is a positive integer value that represents the number of sensor elements of the sensor array 410. In this embodiment, the sensor array 410 represents a set of sensor elements and the electronic device 400 includes additional sensor arrays for the other section(s) of the touch-sensor device. For example, the processing device 210 is coupled to another sensor array, similar to sensor array 410 for a second set of sensor elements that are disposed in the same or different axes of the touch-sensor device. Although only four sensor elements 455(1)-455(N) are illustrated, the set of sensor elements may include more or less sensor elements than four.

As described above, the electronic device may include a first set of sensor elements disposed in a first axis in a plane of a touch-sensor device, and a second set of sensor elements and a third set of sensor elements disposed in a second axis in approximately the same plane. The second set is disposed in a first section of the touch-sensor device and the third set is disposed in a second section that is adjacent to the first section. The first, second, and third sets of sensor elements can be separately scanned to detect a presence of one or more conductive objects on the touch-sensor device. In particular, the first and second set of sensor elements can be used to detect and resolve a location of a first touch in the first section, and the first and third set of sensor elements can be used to detect and resolve a location of a first touch in the second section.

In one embodiment, the touch-sensor device is split into two sections in one axis. In another embodiment, the touch-sensor device is split into three or more sections. In another embodiment, the touch-sensor device is split into four sections. In another embodiment, the touch-sensor device is split into three or more sections in the two axes.

In another embodiment, each section can be configured to detect and resolve two or more substantially simultaneous touches on the section using a multiple-axis configuration of three or more axes of sensor elements, as described below. Multi-axial touch-sensor devices with multi-touch resolution, as described herein, include the capability to detect and resolve locations of two or more substantially simultaneous touches in each section. For example, in one embodiment, the apparatus further includes additional groups of sensor elements disposed in a third axis in the plane of the touch-sensor device. The first, second, third, fourth, fifth, and sixth sets of sensor elements are separately scanned to detect the presence of one or more conductive objects on either of the first and second sections, and to resolve up to two locations, if any, on each of the first and second sections using the six sets of sensor elements disposed in three axes.

In one embodiment, the capacitance sensor 201 includes a selection circuit (not illustrated). The selection circuit is coupled to the sensor elements 455(1)-455(N) and the sensing circuitry of the capacitance sensor 201. The selection circuit may be used to allow the capacitance sensor to measure capacitance on multiple sensor elements. The selection circuit may be configured to sequentially select a sensor element of the multiple sensor elements to provide the charge current and to measure the capacitance of each sensor element. In another embodiment, the selection circuit is used to sequentially select different sets of sensor elements. For example, using the selection circuit, the capacitance sensor 210 can scan the first set of sensor elements in the first axis, separately scan the second set of sensor elements that correspond to the first section in the second axis, and then separately scan the third set of sensor elements that correspond to the second section in the second axis. In another embodiment, multiple capacitance sensors 201 can be used to separately scan the different sets of sensor elements.

In one exemplary embodiment, the selection circuit is a multiplexer array. Alternatively, the selection circuit may be other circuitry inside or outside the capacitance sensor 201 to select the sensor element to be measured. In another embodiment, one capacitance sensor 201 is used to measure capacitance on all or less than all of the sensor elements of the sensor array 410. Alternatively, multiple capacitance sensors 201 may be used to measure capacitance on the sensor elements of the sensor array. The multiplexer array may also be used to connect the sensor elements that are not being measured to the system ground or other reference. This may be done in conjunction with a dedicated pin in the GP1O port 207. In another embodiment, the capacitance sensor 201 may be configured to simultaneously sense the sensor elements, as opposed to being configured to sequentially scan the sensor elements as described above.

In one embodiment, the processing device 210 further includes a decision logic block 402. The operations of decision logic block 402 may be implemented in firmware; alternatively, it may be implemented in hardware or software. The decision logic block 402 may be configured to receive the digital code or counts from the capacitance sensor 201, and to determine the state of the sensor array 410, such as whether a conductive object 303 is detected on or in proximity to the sensor array 410, whether a conductive object 303 is detected on the sensor array, where the conductive object 303 was detected on the sensor array (e.g., determining the X-, Y-coordinates of the presence of the conductive object 303), determining absolute or relative position of the conductive object 303, determining speed of the conductive object 303, or the like.

In another embodiment, instead of performing the operations of the decision logic 402 in the processing device 210, the processing device 201 may send the raw data to the host 250, as described above. Host 250, as illustrated in FIG. 4, may include decision logic 451. The operations of decision logic 451 may also be implemented in firmware, hardware, and/or software. Also, as described above, the host may include high-level APIs in applications 452 that perform routines on the received data, such as compensating for sensitivity differences, other compensation algorithms, baseline update routines, start-up and/or initialization routines, interpolation operations, scaling operations, or the like. The operations described with respect to the decision logic 402 may be implemented in decision logic 451, applications 452, or in other hardware, software, and/or firmware external to the processing device 210.

In another embodiment, the processing device 210 may also include a non-capacitance sensing actions block 403. This block may be used to process and/or receive/transmit data to and from the host 250. For example, additional components may be implemented to operate with the processing device 210 along with the sensor array 410 (e.g., keyboard, keypad, mouse, trackball, LEDs, displays, or the like).

At startup (or boot) the sensor elements (e.g., capacitors 455(1)-(N)) are scanned and the digital code or count values for each sensor element with no activation are stored as a baseline array ($C_P$). The presence of a finger on the sensor element or in proximity to the sensor element is determined by the difference in counts between a stored value for no sensor element activation and the acquired value with sensor element activation, referred to here as $\Delta n$. The sensitivity of a single sensor element is approximately:

$$\frac{\Delta n}{n} = \frac{C_F}{C_P} \quad (15)$$

The value of $\Delta n$ should be large enough for reasonable resolution and clear indication of sensor element activation (e.g., button activation). This drives sensor element construction decisions. $C_F$ should be as large a fraction of $C_P$ as possible. Since $C_F$ is determined by finger area and distance from the finger to the sensor element's conductive traces (through the over-lying insulator), the baseline capacitance $C_P$ should be minimized. The baseline capacitance $C_P$ includes the capacitance of the sensor element pad plus any parasitics, including routing and chip pin capacitance.

In applications for touch-sensor sliders (e.g., sliding sensor elements) and touch-sensor pads it is often necessary to determine finger (or other capacitive objects) position to greater resolution than the native pitch of the individual sensor elements. The contact and fringe-detection area of a finger on a slider, touch-pad, or touch screen sensor is often larger than any single sensor element. In one embodiment, in order to calculate the interpolated position using a centroid, the array is first scanned to verify that a given sensor element location is valid. The requirement is for some number of adjacent sensor element signals to be above a noise threshold. When the strongest signal is found, this signal and those immediately adjacent are used to compute a centroid:

$$\text{Centroid} = \frac{n_{i-1} \cdot (i-1) + n_i i + n_{i+1} \cdot (i+1)}{n_{i-1} + n_i i + n_{i+1}} \quad (16)$$

The calculated value may be fractional. In order to report the centroid to a specific resolution, for example a range of 0 to 100 for 12 sensor elements, the centroid value may be multiplied by a calculated or predetermined scalar. It may be more efficient to combine the interpolation and scaling operations into a single calculation and report this result directly in the desired scale. This may be handled in the high-level APIs. Alternatively, other methods may be used to interpolate the position of the conductive object.

The sensor array may be a grid-like pattern of sensor elements (e.g., capacitive elements) used in conjunction with the processing device 210 to detect a presence of a conductive object, such as a finger, to a resolution greater than that which is native. The touch-sensor pad layout pattern may be disposed to maximize the area covered by conductive material, such as copper, in relation to spaces necessary to define the rows and columns of the sensor array. Substrate materials may be any reasonable dielectric. Substrate and overlay must be optically transparent when used for touch screen applications. Either or both may be opaque for touchpad use. Transparent conductors may consist of various metal oxides, organic polymers, or carbon nanotubes. Alternatively, other types of materials may be used for the substrate, overlay, and conductive material of the touch-sensor device.

The embodiments described below segment the touch-sensor device (e.g., touchpad, touch screen, or the like) into multiple smaller sections or zones, each section can be separately scanned from the neighboring sections.

FIG. 5A illustrates one embodiment of a touch-sensor device 500 having a first set 511 of sensor elements disposed in a first axis 501 and a second set 521 and a third set 531 of sensor elements disposed in a second axis 502. The first set 511 of sensor elements are illustrated as white diamonds on the left side and black diamonds on the right side. In one embodiment, the first set 511 of sensor elements are collectively scanned (both black and white sensor elements). In another embodiment, the left-side sensor elements (white sensor elements) and the right-side of sensor elements (black sensor elements) are separately scanned. The Y-axis sensor elements are split into two independent sliders, Y-slider 520 and Y-slider 530. The Y-slider 520 is a first linear slider disposed on the left side of the touch-sensor device 500 in the Y-axis 502, and includes ten rows of sensor elements (illustrated as diagonally-hashed sensor elements), with each row coupled to a conductive trace that is coupled to the processing device 210 (not illustrated in FIG. 5A). The Y-slider 530 is a second linear slider that is disposed on the right side of the touch-sensor device 500, adjacent to the first linear slider, and includes ten rows of sensor elements (illustrated as vertically-hashed sensor elements), with each row coupled to a conductive trace that is coupled to the processing device 210. The X-slider 510 is a linear slider disposed in the X-axis 501, and includes eight columns of sensor elements, each column coupled to a conductive trace that is coupled to the processing device 210.

In one embodiment, the X-axis sensor elements 511 are not split into two independent sliders, like the Y-axis sensor elements. In another embodiment, the X-axis sensor elements 511 are split up into two or more independent sliders, like the Y-slider 520 and Y-slider 530.

The processing device 210 is configured to separately scan each of the sets 511, 521, and 531 of the sensor elements to detect whether one or more conductive objects are present on the touch-sensor device 500. The processing device 210 resolves the locations of the one or more conductive objects by determining the positions of the conductive objects. The processing device 210 may resolve the locations of two substantially simultaneous touches on the touch-sensor device 500 by resolving a location of a first touch in a first section 503 in which the left-side Y-slider 520 is disposed, and a second touch in a second section 504 in which the right-side Y-slider 530 is disposed.

As described above, the X-slider 510 is configured to be a contiguous eight-segment (e.g., column) linear slider. In one embodiment, the X-slider 510 is configured to be the contiguous eight-segmented linear slider in a first mode (e.g., normal single touch mode), and two four-segmented linear sliders in a second mode (e.g., multi-touch mode). When in the second mode, the X-slider 510 is split to detect a left side X-coordinate and a right-side X-coordinate. In the second mode, the left-side sensor elements can be separately scanned from the right-side sensor elements. Alternatively, the sensor elements of the X-slider 510 are not separately scanned in the second mode, and can resolve the X-coordinate for two touches, so long as the two touches do not share a common axis.

In one embodiment, the touch-sensor device 500 is a touch screen. The touch screen may be assumed to be of a size small enough (e.g., 2.4 to 3.0 inches) that it would not be probable that both of the user's fingers would be present entirely within the same section (e.g., first section 503 or second section 504). If the sections were not small enough, it is possible that the touch ambiguity, as described above, may exist. The split touch-sensor device 500, as described herein eliminates the touch ambiguity for multiple touches on the touch-sensor device, for example, by detecting and resolving a single touch in each section. Alternatively, the touch-sensor device 500 is another type of touch-sensor devices than a touch screen, and the display may be other sizes than described above.

It should be noted that using these embodiments, one possible disadvantage is that the additional sets of sensor elements use additional connection traces to connect to the capacitance sensor 201. However, this possible disadvantage may be not as costly as adding an additional layer of sensor elements. The split touch-sensor device 500 does not require an additional layer of construction (e.g., ITO or PEDOT), so that the construction is no more complex than a standard two-layer X/Y matrix touch screen.

FIGS. 5B and 5C each illustrate one embodiment of a detection profile of two substantially simultaneous touches on the touch-sensor device of FIG. 5A. The processing device 210 detects and resolves the location of the first touch 505 using the left-side maximum 522 (e.g., centroid) calculated on the left-side, Y-axis slider 520, and the first maximum 512 calculated on the X-axis slider 510. The processing device 210 also detects and resolves the location of a second touch 506 using the right-side maximum 532 calculated on the right-side, Y-axis slider 530, and the second maximum 513 calculated on the X-axis slider 510. For example, the first touch 505 is detected using the first set of sensor elements 511 (X-axis slider 510) and the second set of sensor elements 521 (left-side, Y-axis slider 520) of the first section 503, and the second touch 506 is detected using the first set sensor elements 511 (X-axis slider 510) and the third set of sensor elements 531 (right-side, Y-axis slider 530) of the second section 504. Similarly, the processing device 210 detects and resolves location of the first touch 507 using be left-side maximum 523 (e.g., centroid) calculated on the left-side, Y-axis slider 520, and the first maximum 514 calculated on the X-axis slider 510. The processing device 210 also detects and resolves the location of a second touch 508 using the right-side maximum 533 calculated on the right-side, Y-axis slider 530, and the second maximum 515 calculated on the X-axis slider 510.

In one embodiment, the first and second maxima 512 and 513 (or 514 and 515) are detected by scanning the entire first set of sensor elements 511 for the entire X-axis 510 by the capacitance sensor 201. Alternatively, the first and second maxima 512 and 513 (or 514 and 515) are detected by separately scanning a left side of the X-slider 510, and separately scanning a right side of the X-slider 510. In one embodiment, the second and third sets of sensor elements are sequentially scanned to detect the presence of a conductive object on the corresponding section. In another embodiment, the second and third sets of sensor elements are substantially scanned in parallel, such as by using two capacitance sensors 201. Scanning each of the sections in parallel may improve the response time of the device. It should be noted that in scanning the sections in parallel, the scanning is coordinated so as to not interfere with the scanning of the neighboring sections.

Figure 1C:
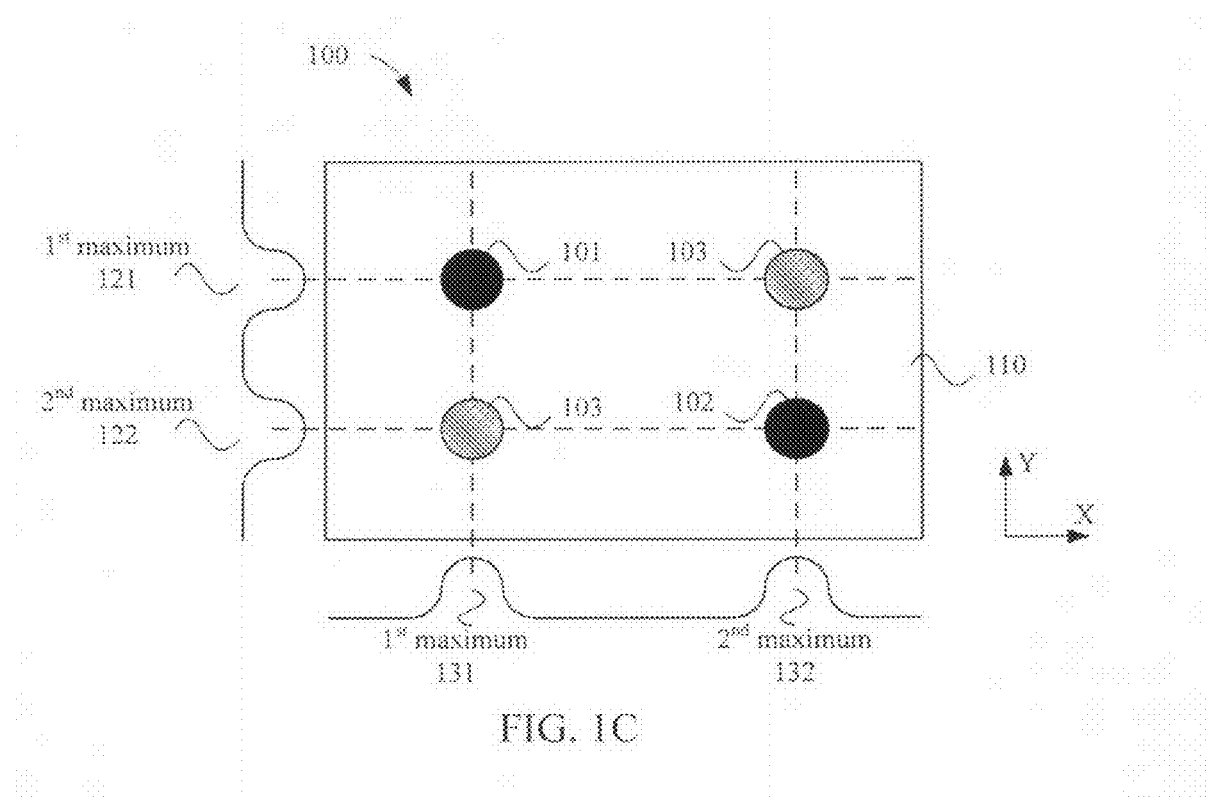
FIG. 1C illustrates the detection profile of FIG. 1A with a second touch on the first type of conventional touchpads.

Unlike the conventional system described with respect to FIG. 1C that cannot determine exactly where the two fingers are located because of two introduced invalid touches (e.g., ghost touches), the processing device 210 and split touch-sensor device 500 are able to resolve the locations of the two substantially simultaneous touches. Unlike the multiple-finger combinations illustrated in FIG. 1C, the processing device 210 is able to resolve the two touch combinations illustrated in FIGS. 5B and 5C.

As seen in the detection profiles, this construction of a split touch-sensor device 500 is free from ambiguous conditions caused by timing or placement of the two substantially simultaneous touches, so long as the two touches remain in the separated sections of the touch-sensor device.

In another embodiment, after the initial detection of the two substantially simultaneous touches in the two sections, if one touch is then detected as moving into the other section, such that two sets of maxima are present on each axis (e.g., within the same half of the touch screen), the locations of both touches may still be resolved. In this embodiment, the last known location of touch that moved out of, for example, the first section of the touch-sensor device 500 indicates the entry point of the same touch into the other section of the touch-sensor device 500. Using the last known location of the touch allows intelligent removal of any invalid touches caused by the presence of two touches in the same section of the touch-sensor device 500.

Although the embodiments described above illustrate a vertical split of the touch-sensor device 500, in other embodiments the touch-sensor device 500 can be split in other configurations based on the specific usage model of the touch-sensor device 500. For example, the split of the touch-sensor device 500 can be made horizontally as illustrated in FIG. 6.

Figure 6:
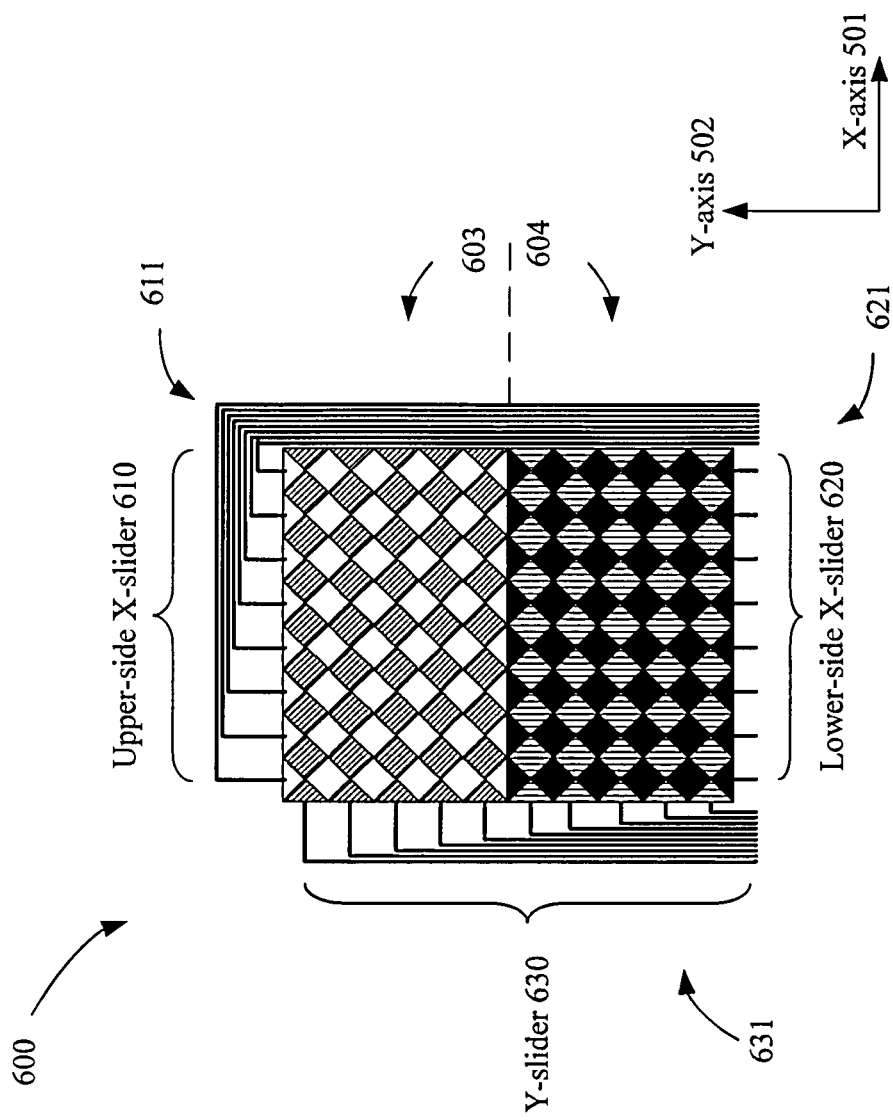
FIG. 6 illustrates another embodiment of a touch-sensor device having a first set and a second set of sensor elements disposed in a first axis and a third set of sensor elements disposed in a second axis.

FIG. 6 illustrates another embodiment of a touch-sensor device 600 having a first set 631 of sensor elements disposed in a first axis (Y-axis 502) and a second set 611 and third set 621 of sensor elements disposed in a second axis (X-axis 501). The X-axis sensor elements are split into two independent sliders, X-slider 610 and X-slider 620. The X-slider 610 is a first linear slider disposed on the upper side of the touch-sensor device 600 in the X-axis 501, and includes eight columns of sensor elements (illustrated as white, diamond-shaped sensor elements), with each column coupled to a conductive trace that is coupled to the processing device 210 (not illustrated in FIG. 6). The X-slider 620 is a second linear slider that is disposed on the lower side of the touch-sensor device 600, adjacent to the first linear slider, and includes eight columns of sensor elements (illustrated as black, diamond-shaped sensor elements), with each column coupled to a conductive trace that is coupled to the processing device 210. The Y-slider 630 is a linear slider disposed in the Y-axis 502, and includes ten rows of sensor elements, each row coupled to a conductive trace that is coupled to the processing device 210.

In one embodiment, the Y-axis sensor elements 631 are not split into two independent sliders, like the X-axis sensor elements. In another embodiment, the Y-axis sensor elements 631 are split up into two or more independent sliders, like the X-slider 610 and X-slider 620. The third set 631 of sensor elements are illustrated as diamond-shaped sensor elements in the Y-axis 502 (illustrated as diagonally-hashed sensor elements on the upper side and vertically-hashed sensor elements on the lower side). In one embodiment, the third set 631 of sensor elements are collectively scanned (both diagonally- and vertically-hashed sensor elements). In another embodiment, the upper-side sensor elements (diagonally-hashed sensor elements) and the lower-side of sensor elements (vertically-hashed sensor elements) are separately scanned.

Figure 7A:
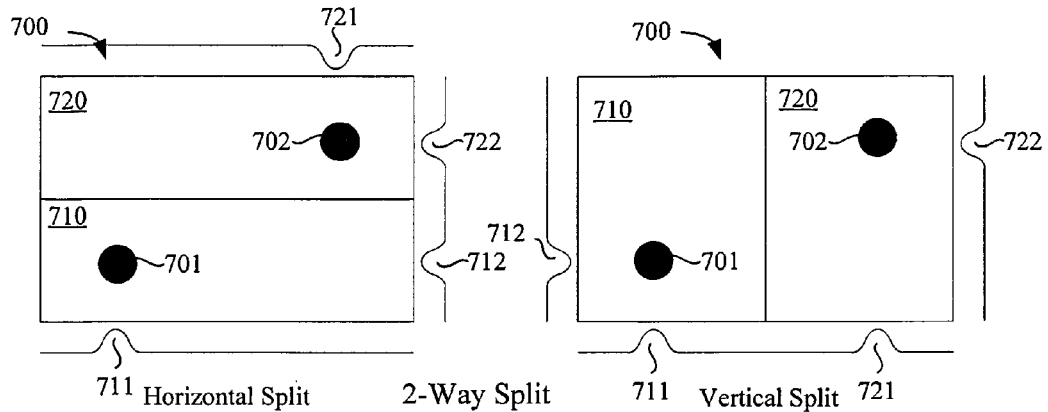
FIG. 7A illustrates detection profiles for two embodiments of a split touch-sensor device having two sections in a plane of the split touch-sensor device.
Figure 7B:
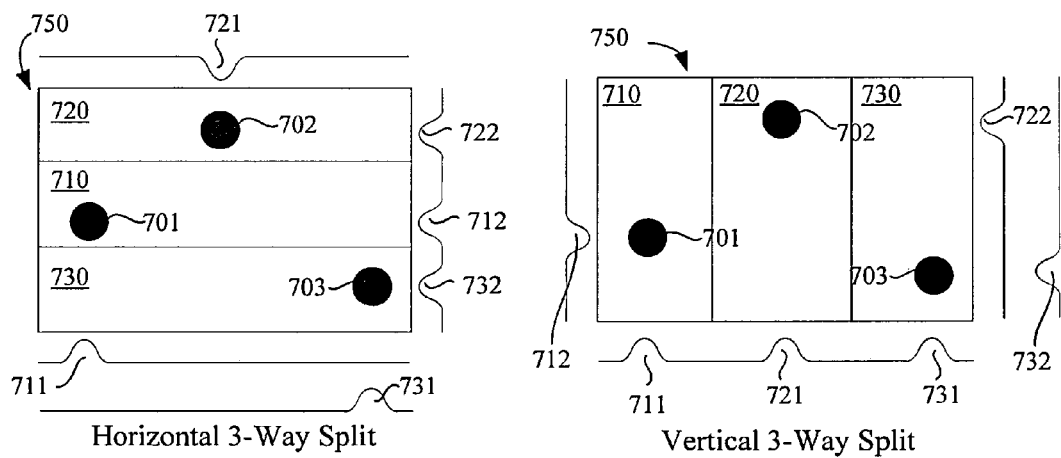
FIG. 7B illustrates detection profiles for four embodiments of a split touch-sensor device having three sections in a plane of the split touch-sensor device.
Figure 7B:
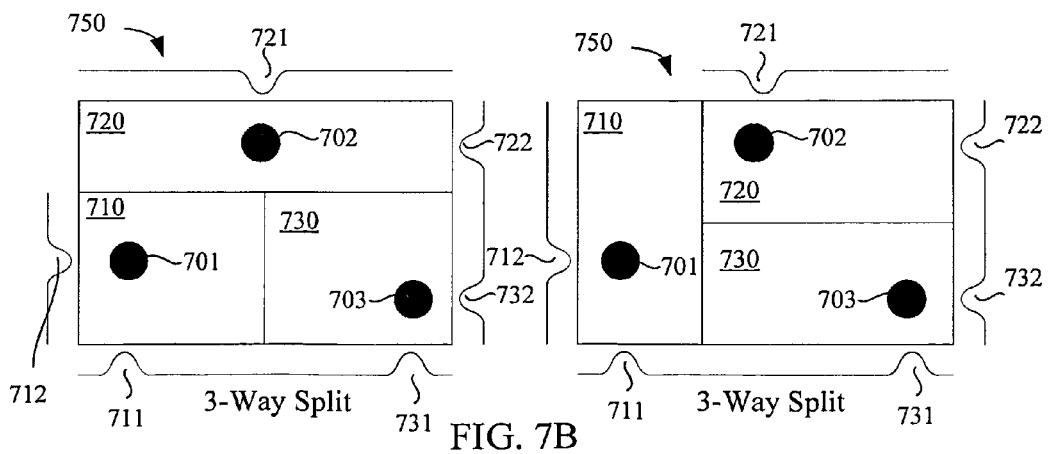
Figure 7C:
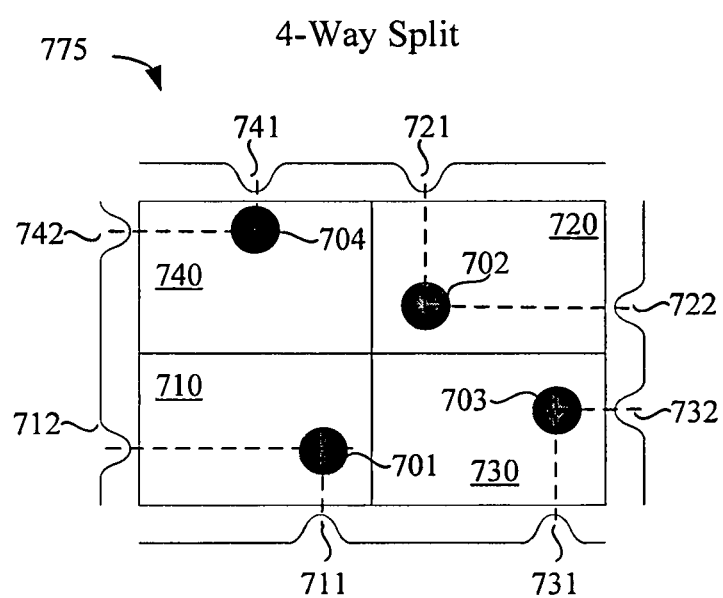
FIG. 7C illustrates detection profiles for an embodiment of a split touch-sensor device having four sections in a plane of the split touch-sensor device.

Although the embodiments of FIGS. 5A-6 illustrate split touch-sensor devices that include two sections that are split in two halves, in other embodiments, the touch-sensor devices can be split in other configurations, such as those illustrated in FIGS. 7A-7C.

FIG. 7A illustrates detection profiles for two embodiments of a split touch-sensor device 700 having two sections 710 and 720 in a plane of the split touch-sensor device 700. The touch-sensor device 700 includes a first section 710 and a second section 720 in which a first touch 701 and a second touch 702 can be separately detected on the respective section. The locations of the first and second touches 701 and 702 can be resolved by calculating the maxima 711 and 721 in the first axis, and 721 and 722 in the second axis, respectively. In one embodiment, the touch-sensor device 700 is a horizontal, two-way split, where the first section 710 is adjacently disposed below the second section 720 from a top-view perspective. In another embodiment, the touch-sensor device 700 is a vertical, two-way split, where the first section 710 is adjacently disposed to the left of the second section 720 from a top view perspective. Alternatively, the touch-sensor device 700 can be split into other types of two-way splits.

In the horizontal, two-way split, a first and second set of sensor elements are separately disposed in the X-axis in the two sections 710 and 720, and one or more additional sets of sensor elements are disposed in the Y-axis spanning the two sections 710 and 720. The processing device 210 separately scans the different sets of sensor elements, and performs a centroid calculation to determine the maxima for each touch. The location of the first touch 701 is resolved using the maximum 711, which is detected by the first set of sensor elements disposed in the X-axis, and maximum 712, which is detected by the set of sensor elements that are disposed in the lower section 710 of the Y-axis. The location of the second touch 702 is resolved using the maximum 721, which is detected by the second set of sensor elements disposed in the X-axis, and maximum 722, which is detected by the other set of sensor elements that are disposed in the upper section 720 of the Y-axis. Similarly in a vertical, two-way split, a first and second set of sensor elements are disposed in the Y-axis, and one or more additional sets of sensor elements are separately disposed in the X-axis spanning the two sections 710 and 720. The processing device 210 separately scans the different sets of sensor elements, and performs a centroid calculation to determine the maxima for each touch. The location of the first touch 701 is resolved using the maximum 712, which is detected by the first set of sensor elements disposed in the Y-axis, and maximum 711, which is detected by the set of sensor elements that are disposed in the left section 720 of the X-axis. The location of the second touch 702 is resolved using the maximum 722, which is detected by the second set of sensor elements disposed in the Y-axis, and maximum 721, which is detected by the other set of sensor elements that are disposed in the right section 720 of the X-axis.

In one embodiment, the processing device 210 includes a single capacitance sensor 201 to separately scan the first, second, and third sets of sensor elements to detect and resolve the locations of a single touch in each of the first and second sections 710 and 720. The single capacitance sensor 201 may scan the first, second, and third sets of sensor elements sequentially. Alternatively, the processing device 210 may include multiple capacitance sensors 201 to separately scan the first, second, and third sets of sensor elements to detect and resolve the locations of a single touch in each of the first and second sections 710 and 720. The multiple capacitance sensors 201 may scan the first, second, and third sets of sensors either sequentially or substantially parallel in time.

FIG. 7B illustrates detection profiles for four embodiments of a touch-sensor device 750 having three sections 710, 720, and 730 in a plane of the split touch-sensor device 750. The touch-sensor device 750 includes a first section 710, a second section 720, and a third section 730 in which a first touch 701, a second touch 702, and a third touch 703 can be separately detected on the respective section. The locations of the first, second, and third touches 701, 702, and 703 can be resolved by calculating the maxima 711, 721, and 731 in the first axis, and 712, 722, and 732 in the second axis, respectively. In one embodiment, the touch-sensor device 750 is a horizontal, three-way split, where the second and third sections 710 and 730 are adjacently disposed above and below the first section 720, respectively, from a top-view perspective. In another embodiment, the touch-sensor device 750 is a vertical, three-way split, where the first section 710 is adjacently disposed to the left of the second section 720, and the third section 730 is adjacently disposed to the right of the second section 720, from a top view perspective. It should be noted that vertical and horizontal, three-way splits are not possible with 2-layer touch screens, though they can be implemented in an opaque touch pad. For example, in a 2-layer touch screen, there is no way to route the connections from at least one of the two axes from the middle section to the edges of the touch screen. In an XY matrix implemented on a touch screen, access to both rows and columns is needed from the edges of the panel. However, in a touch pad (e.g., copper circuit boards), this access is possible using vias or additional routing layers. Alternatively, the touch-sensor device 750 can be split into other types of three-way splits; for example, one horizontal section 720 and two vertical sections 710 and 730, illustrated at the bottom left of FIG. 7B, and, one vertical section 710 and two horizontal sections 720 and 730, illustrated at the bottom right of FIG. 7B.

In the three-way split, at least four sets of sensor elements are disposed in two axes and form the three sections 710, 720, and 730, as described above. The processing device 210 separately scans the different sets of sensor elements, and performs a centroid calculation to determine the maxima for each touch. For example, the location of the first touch 701 is resolved using the maximum 711, which is detected by the first set of sensor elements disposed in the X-axis, and maximum 712, which is detected by the set of sensor elements that are disposed in the middle section 710 of the Y-axis (illustrated in the top left example of FIG. 7B). The location of the second touch 702 is resolved using the maximum 721, which is detected by the second set of sensor elements disposed in the X-axis, and maximum 722, which is detected by the set of sensor elements that are disposed in the upper section 720 of the Y-axis. The location of the third touch 703 is resolved using the maximum 731, which is detected by the third set of sensor elements disposed in the X-axis, and maximum 732, which is detected by the set of sensor elements that are disposed in the lower section 730 of the Y-axis. Similarly, the three touches can be detected and resolved in the three sections 710, 720, and 730 of the other types of three-way splits.

In one embodiment, the processing device 210 includes a single capacitance sensor 201 to separately scan the four sets of sensor elements to detect and resolve the locations of a single touch in each of the first, second, and third sections 710, 720, and 730. The single capacitance sensor 201 may scan the four sets of sensor elements sequentially. Alternatively, the processing device 210 may include multiple capacitance sensors 201 to separately scan the four sets of sensor elements to detect and resolve the locations of a single touch in each of the first, second, and third sections 710, 720, and 730. The multiple capacitance sensors 201 may scan the four sets of sensors either sequentially or substantially parallel in time.

In other embodiments, the touch-sensor device is split into more than three sections, such as a touch-sensor device having four quadrants. The processing device 210 is configured to independently sense and resolve the X and Y locations of a touch in each section (quadrant), allowing four substantially simultaneous touches to be detected and resolved on the touch-sensor device. By having four sections, the potential of having two touches in a common area and preventing touches from sharing a common vertical or horizontal axis are decreased, as described with respect to the conventional touchpads.

FIG. 7C illustrates detection profiles for an embodiment of a split touch-sensor device 775 having four sections 710, 720, 730, and 740 in a plane of the split touch-sensor device 775. The touch-sensor device 775 includes a first section 710, a second section 720, a third section 730, and a fourth section 740 in which a first touch 701, a second touch 702, a third touch 703, and a fourth touch 704 can be separately detected on the respective section. The locations of the first, second, third, and fourth touches 701, 702, 703, and 704 can be resolved by calculating the maxima 711, 721, 731, and 741 in the first axis, and 712, 722, 732, and 742 in the second axis, respectively. In one embodiment, the touch-sensor device 775 is a four quadrant panel that includes four sections 710, 720, 730, and 740 that are substantially equal in size from a top-view perspective. Alternatively, the touch-sensor device 775 can be split into other types of four-way splits having various sizes and different combinations of sections in the two axes.

In the four-way split, at least four sets of sensor elements are disposed in two axes and form the four sections 710, 720, 730, and 740. Here the X-axis sensor elements (columns) are split into an upper and lower half, and the Y-axis sensor elements (rows) are split into a left and right half. The processing device 210 separately scans the different sets of sensor elements, and performs a centroid calculation to determine the maxima for each touch. For example, the location of the first touch 701 is resolved using the maximum 711, which is detected by a first set of sensor elements disposed in the lower-half of the X-axis, and maximum 712, which is detected by a second set of sensor elements disposed in the left-half of the Y-axis. The location of the second touch 702 is resolved using the maximum 721, which is detected by a third set of sensor elements disposed in the upper-half of the X-axis, and maximum 722, which is detected by a fourth set of sensor elements disposed in the right-half of the Y-axis. The location of the third touch 703 is resolved using the maximum 731, which is detected by the first set of sensor elements disposed in the lower-half of the X-axis, and maximum 732, which is detected by a fourth set of sensor elements that are disposed in the right-half of the Y-axis. The location of the fourth touch 704 is resolved using the maximum 741, which is detected by the third set of sensor elements disposed in the upper-half of the X-axis, and maximum 742, which is detected by a second set of sensor elements that are disposed in the left-half of the Y-axis.

Although the embodiment described above with respect to FIG. 7C includes four sets of sensor elements, two disposed in the Y-axis and two disposed in the X-axis, in other embodiments, the four sets of sensor elements can be disposed in other configurations, such as four sets disposed in the Y-axis, and four sets disposed in the X-axis, or the like.

In one embodiment, the processing device 210 includes a single capacitance sensor 201 to separately scan the four sets of sensor elements to detect and resolve the locations of a single touch in each of the first, second, third, and fourth sections 710, 720, 730, and 740. The single capacitance sensor 201 may scan the four sets of sensor elements sequentially. Alternatively, the processing device 210 may include multiple capacitance sensors 201 to separately scan the four sets of sensor elements to detect and resolve the locations of a single touch in each of the first, second, third, and fourth sections 710, 720, 730, and 740. The multiple capacitance sensors 201 may scan the four sets of sensors either sequentially or substantially parallel in time.

In another embodiment, the sections of the touch screen can be implemented with tri-axial sensing, allowing resolution of two independent touches in each section of the touch-sensor device. Also, in another embodiment, should a touch move from one section into an alternate section in which two touches are already present, the third touch can be resolved using the last known location (e.g., point of exit) from the other section. Alternatively, more than three axes can be used in one or more of the sections of the multi-section touch-sensor device to detect and resolve the locations of three or more substantially simultaneous touches on each section of the multi-section touch-sensor device.

The general rule in normal linear algebra for solving for variables is that n equations are needed to solve for n unknowns. In this case of touchpads, the set of equations is not linear based, but on planar space where a second variable is needed to solve for even the first point. However, since all following points are known to reside in the same plane of the touchpad, one more variable is needed to resolve each additional point.

In the case of axial sensing, this translates into one additional axis for each additional point that needs to be resolved in each section of the multi-section touch-sensor device. Since all points are still in the same plane, instead of using an orthogonal coordinate system a touchpad that supports more than two axes within the same plane of the section can be used.

The general equation for the number of points that may be resolved within a plane of a single section is:

$$\text{Points} = \text{Axes} - 1 \tag{17}$$

To get these additional axes within the same plane of the single section, the axes intersect at angles other than 90 degrees. The general equation for the nominal angle of intersection of the sensing axes in a touchpad having two or more axes is:

$$\text{Angle} = 180°/\text{Axes} \tag{18}$$

The following table lists some of the combinations that come from such a system of axes.

TABLE 1

| Points | Axes | Interior Angle |
|---|---|---|
| 1 | 2 | 90° |
| 2 | 3 | 60° |
| 3 | 4 | 45° |
| 4 | 5 | 36° |
| 5 | 6 | 30° |
| 8 | 9 | 20° |

Note here that to sense and resolve two substantially simultaneous points or touches within a plane of a section of the multi-section touch-sensor pad, a minimum of three axes for each section needs to be used. While in reality these axes can be at any reasonable angle to each other, optimal sensing occurs when they are at equal angles to each other.

The next step is to determine how to get three axes of sensing from a single plane. In one embodiment, a hexagon shape is used for the sensor elements to get three axes of sensing from a single plane. In another embodiment, a diamond shape is used for the sensor elements. It should be noted that a diamond shape and a hexagon shape may not necessarily be optimal for all implementations. In alternative embodiments, other lines (e.g., rows, columns, diagonal columns, or diagonal rows) of tessellated shapes or strips of electrically conductive material may be used for the sensor elements. In one embodiment, the sets of sensor elements are disposed approximately 60 degrees between each axis and include one or more lines of tessellated shapes. In another embodiment, the sets of sensor elements are disposed approximately 45 degrees between each axis (e.g., quad-axial sensing) and include one or more lines of tessellated shapes. Alternatively, other angles may be used.

In most cases, touch sensitive surfaces are engineered to limit their detection capability to that of the worst case condition; however, in special cases they can handle more. Note that when multiple touches do not create ghost touch locations, it is possible to detect and resolve the location of three or more substantially simultaneous touches within a section of the touch-sensor device that implements a tri-axial scheme. It may be possible to remove the invalid locations (e.g., ghost locations) by defining those areas where ghost locations may occur to be invalid or by removing the sensing elements from that part of the sensing surface.

Conventional implementations were either designed for single touch (XY row/column) or fully addressable matrix supporting any number of touches. The multi-axial sensing scheme described herein may allow resolution of two or more touches without additional routing layers, and possibly increasing minimally the number of connections to the capacitance sensing device.

As noted, the addition of a third axis does increase the number of connections between the sensor array and a capacitive sensing controller, however, the number of connections can also be reduced if proper visualization is used within each of the axes to be scanned. For example, when first looking at the number of sensing elements to scan in the tri-axial diamond array (illustrated in FIG. 8B), it appears to take six signals to scan each axis of sensor elements. However, if the end of each of the first and second axes of sensor elements (e.g., sensor elements disposed on diagonal axes) is wrapped back upon themselves (e.g., diagonals connected as virtual cylinders), it is possible to combine the partial rows (or columns), and thus, reduce the total number of sensing signals between the sensor array. For this example, the first axis of sensor elements could be reduced from six to five signals (e.g., signals connected to pins of the processing device), and the second axis of sensor reduced from six to five signals.

FIG. 8A illustrates one embodiment of a detection profile of two touches on each section of a split touch-sensor device 800 using tri-axial sensing. The split touch-sensor device 800 includes two sections 810 and 820 that are disposed adjacent to one another in which locations of two touches (801 and 802 or 803 and 804) can be separately detected on the respective section. In particular, the second section 820 is adjacently disposed below the first section 810, from a top-view perspective. The locations of the first and second touches 801 and 802 can be resolved by calculating the maxima 811 and 821 in the first axis 860, the maxima 812 and 822 in the second axis 870, and maxima 813 and 823 in the third axis 880 respectively. In this embodiment, the touch-sensor device 800 is a horizontal, two-way split, where the second section 820 is adjacently disposed below the first section 810, from a top-view perspective. In other embodiments, tri-axial sensing may be implemented in other types of split touch-sensor devices, such as other types of two-way splits, such as vertical, two-way splits, three-way splits (e.g., in touch pads), or other types of split touch-sensor devices that include more than three splits. In other embodiments, tri-axial sensing may be implemented with the sensing axes rotated 90 degrees from that shown in FIG. 8B, or alternately in other angular rotations. In other embodiments, more than three axes of sensor elements may be implemented in one or more sections of a split touch-sensor device.

In the two-way split for tri-axial sensing shown in FIG. 8A, at least six sets of sensor elements are disposed in three axes and form the two sections 810 and 820. The processing device 210 separately scans the different sets of sensor elements, and performs a centroid calculation to determine the maxima for each touch. For example, the location of the first touch 801 is resolved using maximum 811, which is detected by a first set of sensor elements disposed in a first axis 860, maximum 812, which is detected by a second set of sensor elements disposed in a second axis 870, and maximum 813, which is detected by a third set of sensor elements disposed in a third axis 880. The location of the second touch 802 is resolved using the maxima 821, 822, and 823, which are detected by the first, second, and third sets of sensor elements disposed in the first, second, and third axes 860, 870, and 880, respectively.

In one embodiment, the second section 820 includes three similar axes of sensor elements as those described above in the first section 810. In this embodiment, a fourth set of sensor elements is disposed in the first axis 860 but are separate from the first set of sensor elements disposed in the first axis 860, a fifth set of sensor elements are disposed in the second axis 870 but are separate from the second set of sensor elements disposed in the second axis 870, and a sixth set of sensor elements are disposed in the third axis 880 but are separate from the third set of sensor elements disposed in the third axis 880. In other embodiments, other combinations of sets of sensor elements are possible, such as the set of sensor elements being the same on both sections for the first axis 860 and the third axis 880, or for the first axis 860 and the second axis 870. In another embodiment, the two sections 810 and 820 share only one common set of sensor elements. For example, a set of sensor elements is disposed in both sections 810 and 820 in the third axis 880, and two separate sets of sensor elements are disposed in both sections 810 and 820. Alternatively, four or more sets of sensor elements may be disposed in other configurations to detect and resolve the location of at least two substantially simultaneous touches, if any, within a single section, by separately scanning the different sets of sensor elements.

It should be noted that in a conventional XY row/column sensing device, the location of a touch is determined by the intersection of sensed maxima on the rows and the columns. When using a tri-axial sensing device, a touch may be declared when sensed maxima from all three axes intersect. If the maxima are found only at the intersection of two of the three axes, the intersection of the two axes can be properly rejected as a possible touch. Similarly, when using a quad-axial sensing device, a possible touch may be declared when sensed maxima from all four axes intersect. If the maxima are found only at the intersection of two or three of the four axes, the intersection of the two or three axes indicates an invalid location (e.g., ghost location) and can be properly rejected as a possible touch. However, just as the XY touchpad can yield invalid combinations when greater than one touch is present, a tri-axial touch-sensor device and a quad-axial touch-sensor device can yield invalid combinations (i.e., ghost touches) when more than two, and more than three touches are present on the respective sections of the touch-sensor devices.

FIG. 8B illustrates one embodiment of a layout 850 for diamond-based tri-axial sensing in a section 810 of the split touch-sensor device of FIG. 8A. Layout 850 includes three independent sensing axes, namely first axis 860, second axis 870, and third axis 880. The first axis 860 includes multiple sensors 811 disposed along the first axis 860, illustrated as white diamonds (e.g., full or partial diamonds). The first axis 860 is disposed on a diagonal with respect to the horizontal sensing axis 880 (e.g., approximately 60° from the horizontal axis). Diagonal columns of the sensor elements 811 are coupled to interconnecting traces 812, which are coupled to the processing device 210. It should be noted that although the sensor elements 811 of the first axis 860 have been referred to as diagonal columns, these sensor elements 811 of the first axis 860 could be considered diagonal rows. Since the sensor elements 811 are disposed diagonally within a rectangular shape, some of the diagonal columns of sensor elements 811 are partial columns; for example, each complete diagonal column of the first axis 860 includes six sensor elements, and the partial columns include four sensor elements or two sensor elements. Alternatively, other numbers of sensor elements can be used in the complete and partial diagonal columns of the first axis 860.

The second axis 870 includes multiple sensors 821 disposed along the second axis 870, illustrated as hashed diamonds (e.g., full or partial diamonds). The second axis 870 is disposed on a diagonal with respect to the horizontal sensing axis 880. Diagonal columns of the sensor elements 821 are coupled to interconnecting traces 822, which are coupled to the processing device 210. It should be noted that although the sensor elements 821 of the second axis 870 have been referred to as diagonal columns, these sensor elements 821 of the second axis 870 could also be considered diagonal rows. Since the sensor elements are also disposed diagonally within the rectangular shape, some of the diagonal columns of sensor elements 821 are partial columns; for example, each complete diagonal column of the second axis 870 includes six sensor elements 821, and the partial columns include four sensor elements or two sensor elements. Alternatively, other numbers of sensor elements can be used in the complete and partial diagonal columns of the second axis 870.

The third axis 880 includes multiple sensors 831 disposed along the third axis 880, illustrated as black diamonds (e.g., full or partial diamonds). The third axis 880 is disposed on a horizontal axis. Columns of the sensor elements 831 are coupled to interconnecting traces 832, which are coupled to the processing device 210. Since the sensor elements 831 are disposed in columns within the rectangular shape, all of the columns of sensor elements 831 are complete columns; for example, each complete column of the third axis 880 includes four sensor elements (e.g., half of the columns have a half-diamond sensor element on top and one half-diamond sensor element on bottom). Alternatively, other numbers of sensor elements can be used in the complete columns of the third axis 880.

It should be noted that although the layout 850 includes three sensing axes, one disposed on a horizontal axis and two diagonal axes, other configurations are possible, such as three diagonal axes, or one vertical axis and two diagonal axes. As described above, since there are three axes, the nominal angle of intersection is approximately 60°; however, other angles of intersection may be used. Also, as described above, since the layout 850 includes three axes, the processing device 210 is configured to detect multiple (e.g., two or more) substantially simultaneous touches and resolve at least two touches within each section of the plane of the touch-sensor device.

The sensor elements 811, 821, and 831 of FIG. 8B have a diamond shape. In another embodiment, the sensor elements may have a hexagon shape. The hexagon shape, which has the highest ratio of surface area to perimeter for a regular tessellating polygon, is commonly used in copper or other low sheet-resistance based surfaces for capacitive sensing. This ratio plays into the signal-to-noise (SNR) ratio of the overall capacitive sensing system. The higher the ratio, the lower the parasitic capacitance. However, when implemented with hexagons, there is significant trace length of the interconnecting traces between each of the sensor elements. In a low-sheet-resistance media, for example, copper, carbon, silver ink, or the like, these interconnecting traces do not have a significant impact on how sensing is performed. It should be noted that, when using diamond sensor elements, the interconnecting traces between adjacent sensor elements within the same row or column may be shorter than the interconnecting traces between the hexagonal-shaped sensor elements. This may make the diamond shape appropriate for use on high sheet-resistance material, such as ITO, which is often used on transparent touch screens.

In high-sheet-resistance material, for example, Indium Tin Oxide (ITO), PEDOT:PSS, or the like, these interconnecting traces contribute significant resistance to the sensing of each row, column, or diagonal of coupled sensor elements, such that the scanning rate may need to be slowed considerable to allow any external coupled capacitance to be sensed. To deal with this, an alternate pattern based on a diamond shape may be used. The diamond shape allows connection between elements to occur at or near the vertices of the sensor elements, thus limiting the resistance impact to sensing of the entire row or column. Alternatively, other shapes of tessellating shapes may be used.

As noted, the addition of a third axis does increase the number of connections between the sensor array and a capacitive sensing controller (e.g., processing device 210), however, the number of connections can also be reduced if proper visualization is used within each of the axis to be scanned. In one embodiment, the number of interconnecting traces that are coupled to the processing device 210 is equal to the number of complete and partial columns or rows for each of the axes. In another embodiment, the end of each of the first and second axes of sensor elements (e.g., sensor elements 811 and 821 disposed on diagonal axes) is wrapped back upon themselves (e.g., diagonals connected as virtual cylinders), it is possible to combine the partial diagonals to have the same number of sensor elements as the complete rows, and thus, reduce the total number of sensing signals and the number of interconnecting traces that are coupled to the processing device.

Since touchpads (or touch screens) are common in consumer-level hardware, their implementation is generally quite cost-sensitive. In one embodiment, an XY row/column touchpad may be implemented on as few as two routing layers; generally, a top surface where all the sensor elements are located, and a lower surface where the sensing elements in either the rows or columns are joined together. With the tri-axial sensor elements described herein, it is also possible to route them on the same two layers that are used for a dual axis XY touchpad.

Although the embodiments of FIGS. 8A and 8B illustrate and describe tri-axial sensing in each section, in other embodiments, three or more substantially simultaneous touches can be resolved using four or more axes in the touch-sensor device. For example, quad-axial sensing can be used, and the intersection of four maxima of the four axes can be used to resolve the locations of the "actual" touches of three substantially simultaneous touches within a section, and reject the invalid locations (e.g., "ghost" locations) as possible touches.

The embodiments described herein allow the touch-sensor device to be a multi-touch device, allowing detection and resolution of more than a single touch without adding additional sensing planes. In other embodiments, additional sensing planes may be used to detect and resolve even additional substantially simultaneous touches. Detecting and resolving multiple substantially simultaneous touches expands the capabilities of the device for user interaction. For example, a single touch interface device allows a user to touch on icons on the display to activate a function, manipulate a cursor similar to a mouse on a notebook or other personal computer, and implement linear and rotational slider controls, such as volume, display brightness, or the like. The embodiments described herein expand the scope of the user interface to make it more intuitive and natural. For example, the embodiments described herein expand the scope of gestures that can be detected on the touch-sensor device. Additional gestures may include various forms of selection and manipulation using more than just a single touch. Some examples of potential gestures that are enabled by a multi-touch sensor device touches are described and illustrated with respect to FIG. 9; however, additional multi-touch gestures than those described below may be detected.

Figure 9:
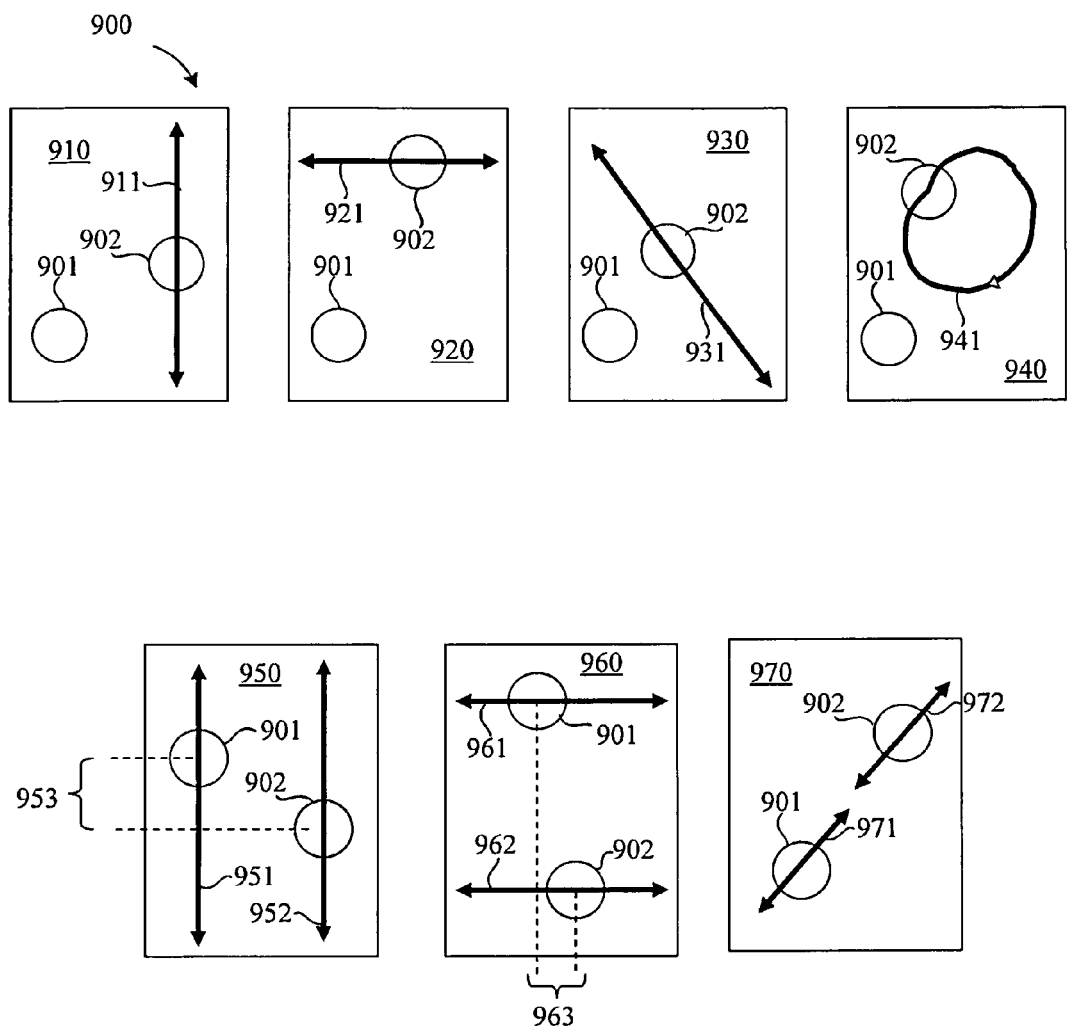
FIG. 9 illustrates embodiments of gestures that can be detected on a touch-sensor device that can detect and resolve locations of two or more substantially simultaneous touches on multiple sections.

FIG. 9 illustrates embodiments of gestures 900 that can be detected on a split touch-sensor device, which can detect and resolve locations of two or more substantially simultaneous touches on multiple sections. The split touch-sensor device is configured to detect various gestures 900 and resolving locations of multiple substantially simultaneous touches on multiple sections of the split touch-sensor device. For example, gesture 910 is detected when two substantially simultaneous touches 901 and 902 are detected on the touch-sensor device in separate sections, and linear movement 911 of one of the touches 902 is detected (e.g., the touch 902 moving up or down). The detection of the gesture 910 may cause a scrolling function (e.g., vertical scrolling) to be performed. Alternatively, the gesture 910 may cause other functions to be performed, such as a zooming function, volume control, or the like. Similarly, the gesture 920 is detected when two substantially simultaneous touches 901 and 902 are detected on the touch-sensor device in separate sections, and linear movement 921 of one of the touches 902 is detected (e.g., the touch 902 moving left or right). The detection of the gesture 920 may cause a scrolling or panning function (e.g., horizontal scrolling) to be performed. Alternatively, the gesture 920 may cause other functions to be performed, such as a zooming function, volume control, or the like. The gesture 930 is similar to the gestures 910 and 920, except, a diagonal movement 931 is detected, causing a different function (e.g., a growing/shrinking function, a zooming function, a scrolling function, minimizing function, or the like) to be performed.

In another embodiment, non-linear movement of the touches may be detected, such as rotational movement 941 for gesture 940. The gesture 940 is detected when simultaneous touches are detected on the touch-sensor device in separate sections, and rotational movement 941 of one of the touches 902 is detected (e.g., the touch 902 moving in a clockwise direction). The detection of the gesture 940 may cause a rotating function (e.g., rotational scrolling) to be performed. For example, the gesture 940 may be used to rotate a picture, control volume (up or down depending on clockwise, or counter-clockwise direction of rotation), turn "pages", change brightness up and down, or the like. Alternatively, the gesture 940 may cause other functions to be performed, such as rotary slider functions, or the like.

In other embodiments, movement of two or more touches may be detected substantially simultaneously, such as the linear movements 951 and 952, 961 and 962, or 971 and 972 of gestures 950, 960, and 970, respectively. For example, the gesture 950 is detected when two substantially simultaneous touches 901 and 902 are detected on the touch-sensor device in separate sections, and linear movement 951 of the first touch 901 and linear movement 952 of the second touch 902 are detected (e.g., the first touch 901 moving up or down, and the second touch 902 moving up or down). The detection of the gesture 950 may cause a vertical scrolling function to be performed. Alternatively, the gesture 950 may cause other functions to be performed, such as a pan function, or the like. It should be noted that the skew 953 in the finger's vertical position is no problem. As illustrated in the FIG. 9, the two finger touches in gesture 950 are not required to be aligned on any axis, which indicates the "skew" 953. Since the fingers are touching down in different sections of the split touch screen, they are independently sensed, and do not interfere with each other. All that is looked for to detect the gestures is the relative motion of the fingers. As such, in these embodiments, the presence of skew does not present any problems in detecting the particular gesture. Similarly, the gesture 960 is detected when two substantially simultaneous touches 901 and 902 are detected on the touch-sensor device in separate sections, and linear movement 961 of the first touch 901 and linear movement 962 of the second touch 902 are detected (e.g., the first touch 901 moving left or right, and the second touch 902 moving left or right). The detection of the gesture 960 may cause a horizontal scrolling function to be performed. Alternatively, the gesture 960 may cause other functions to be performed, such as a pan function, or the like. For example, the gestures 950 and 960 may be used to move objects or move through lists. These can be made ballistic too, such that the faster the motion is done the faster or farther the object is moved.

It should be noted that the skew 963 in the finger's horizontal position of gesture 960 needs to be minimized, or the touch sensor should be implemented with a horizontal split such as that shown in FIG. 6. It should also be noted that the gestures shown in FIG. 9 are examples of gestures detected on the vertical split screen examples shown in FIGS. 5A-5C. Alternatively, these and other types of gestures may be detected on other configurations of split touch-sensor devices described herein.

The gestures shown in FIG. 9 all assume implementation on a 2-way vertically split panel. This is why, in the two separate vertical motions (gesture 950) each finger is tracked separately. For the horizontal motion shown in gesture 960, when detected on the vertical split panel, the two touches need to remain substantially in-line. This presents a single-touch detection on the X-axis and two touch detection on the Y-axis, with the gesture being detected as movement of both fingers from one section to the other. If the fingers separate too much, they will cross the split point separate from each other, causing a time when each zone has one separate touch.

In another embodiment, the gesture 970 can be detected. The gesture 970 is detected when two substantially simultaneous touches 901 and 902 are detected on the touch-sensor device in separate sections, and when linear movement 971 of the first touch and linear movement 972 of the second touch 902 are detected moving towards or away from the initial positions of the touches 901 and 902 (e.g., the first touch 901 moving away from the second touch 902, the second touch 901 moving away from the first touch 901, or a combination of both). The detection of the gesture 970 may cause a "pinch" function to be performed. For example, the "pinch" function 970 could be used to resize a picture, a list, screen font size in a window, or the number of entries displayed in a window or list. Alternatively, the gesture 970 may cause other functions to be performed, such as a grow/shrink function, or the like.

In other embodiments, other multi-touch gestures than those described above can be detected on the split touch-sensor device and other functions than those described above can be performed in response to detecting these multi-touch gestures.

Figure 10:
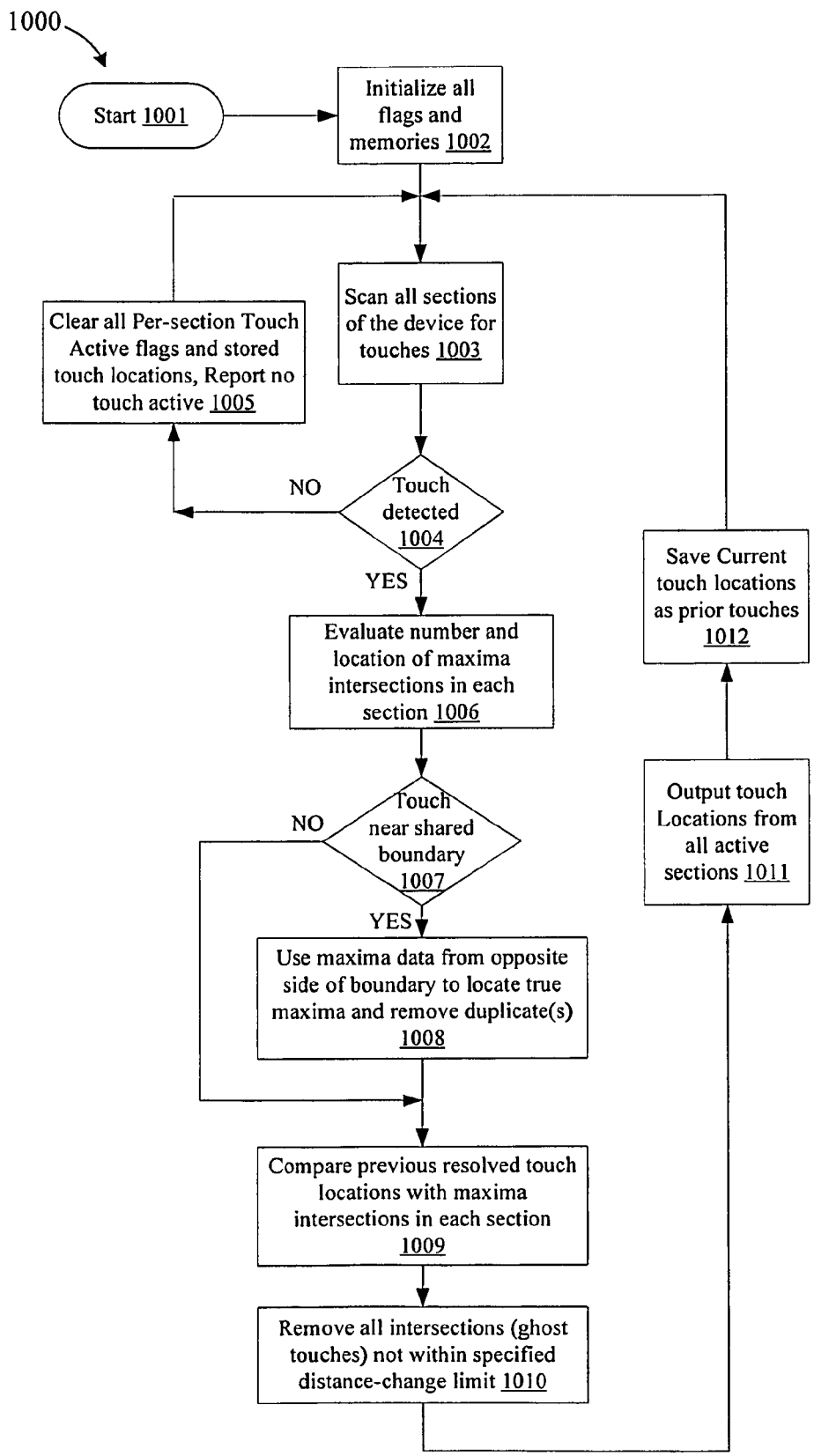
FIG. 10 illustrates a flowchart of one embodiment of a method for resolving locations of two substantially simultaneous touches on a touch-sensor device.

FIG. 10 illustrates a flowchart of one embodiment of a method 1000 for resolving locations of two substantially simultaneous touches on a split touch-sensor device. The method 1000 starts in operation 1001, and initializes all flags and memories, operation 1002. The touch flags and memories are used to track the touches detected and resolved on the split touch-sensor device. All sections of the split touch-sensor device are separately scanned to detect touches, operation 1003. During the scan, the capacitance is measured on all of the sensor elements that correspond to the sections. The method then determines, based on the presence of detected capacitance maxima above some touch threshold, whether there were any touches detected on the split touch-sensor device, operation 1004. If no touches are detected in operation 1004, then a "no touches present" condition is reported, and all per-section touch-active flags and stored touch location memories are cleared, operation 1005. However, if there are touches detected in operation 1004, the method evaluates the number and location of maxima intersections in each of the sections, operation 1006. The method may calculate the centroid for each capacitance maxima and their projected intersections to determine the locations of the touches. It should be noted that all sensors are tracked for a baseline level, and also have a threshold above the baseline to determine if a touch is present. When the sensed capacitance on any sensor is above the "touch present" level, it and the sensors adjacent to it are measured for their relative magnitudes to determine a proper centroid of touch. Any sensor below the touch-present threshold is a no-touch area, while those above it indicate detection of a touch. In areas where the fingers are close together, all of the sensors in that area may indicate touch being present.

The method 1000 then analyzes the boundaries of each section for any number of touches, and determines whether each touch detected in operation 1004 is near shared boundaries of the sections, operation 1007, such as within a specified distance from the boundary between the sections. If a touch is near the shared boundary, the method uses the touch capacitance data from the opposite side of the shared boundary (in addition to the data already available from the existing section) to locate the true maxima and remove duplicate touches, operation 1008. If a touch is not near the shared boundary, as determined in operation 1007, the method then skips operation 1008.

Next, the method 1000 compares the previous resolved touch locations with maxima intersections in each section, operation 1009, and removes all intersections of invalid touches (e.g., ghost touches) that are not within a specified limit in the change in distance. For example, looking at the two touches 505 and 506 in FIG. 5B, since each touch occurs wholly in its own section, when each section is scanned only a single maxima is detected on each axis in each of the sections (as shown by the maxima pairs 512/522 and 513/523) and therefore there are no ghost touches present. Over the following scans of the panel, as the touch 506 is moved to the left and approaches the split in the panel, it will eventually be detected as a second weak maxima on the left section (i.e., another bump in maxima curve 522), and the right section will have a strong maxima detected along the split boundary (i.e., maxima 513 moves to the left edge of the section). Because the touch is detected partially on both sides of the split, the data from both sides needs to be used to calculate the actual centroid of the touch. This operation only works if the motion between scans is slow enough and limited enough to detect and track the object as it passes from one section to the other. If the object is observed completely in the right section of the panel on one scan, and then detected completely in the left section in the second scan, it is impossible to remove the ghost points created by the second touch in the left section. This would be perceived as if the finger was lifted from the right section and placed down in the left, and would present a situation similar to that in FIG. 1C, where two touches are present with half being invalid and no way to identify which are valid and which are invalid.

Using the stored location of touches resolved in the previous scan of the panel, in conjunction with the current scan information, it is possible to identify and eliminate the invalid touches. For example, the resolved locations of the first and second touches detected during a first scan are stored in memory. During a second scan, multiple touches can be detected, and invalid touches may be identified and removed when the new locations of the multiple touches are not within a specified limit in the change of distance from the first and second locations stored in the memory. Thus the speed at which the panel is scanned and the maximum velocity of motion of the conductive objects may determine a distance change limit. This is nominally motion, between consecutive scans of the panel, of one or two columns (or rows, depending on the direction of the split). If the scan speed is slower than this, or the finger motion is faster, then the finger can move across the split at a location unknown to the controller. In another embodiment, using the stored locations of touches resolved in the previous scan of the panel, the method can resolve the locations of multiple touches when one of the substantially simultaneous touches moves from one section to another. For example, the method may resolve the locations of two touches within the same section using the stored information of the one or more touches detected in the previous scan. In one exemplary embodiment, a first touch is detected in the first section and a second touch is detected in the second section during a first scan. During a second scan, the first touch and second touch are detected in the first section (e.g., second touch moved from the second section to the first section). The method identifies an invalid touch, if any, created by the presence of the first and second touches both being detected in the first section, as described herein, by using the locations of the first and second touches detected during the first scan. Once identified, the method can remove the identified invalid touch, if any, to resolve the locations of the first and second touches, even though the first and second touches are located within the same section.

Once the method has removed all intersections (e.g., ghost touches) not within the specified distance-change limit in operation 1010, the method 1000 then outputs all touch locations from all active sections, operation 1011, and saves the current touches as the prior touches 1012. After the current touches are saved as the prior touches, the method returns to operation 1003 to scan all sections of the split touch-sensor device for touches.

The method of FIG. 10 is equally applicable to split tri-axial and other multi-axial touch sensor implementations. It should be noted that, due to the tri-axial implementation of the touch sensor, the operation of resolving locations of the two substantially simultaneous touches may be done without the use of an APA array in the touch-sensor device. When performed on split tri-axial touch sensors, operation 1003 includes sensing on all axes present within each section. Unlike when performed on a split XY sensor, the use of tri-axial sensor sections permits resolution of two simultaneous touches in each of the sections of the touch sensor. When performed on a two section touch sensor such as that illustrated in FIG. 8B, this would allow detection of at least four independent touches on the touch sensor. Operation 1004, when performed on sections of a tri-axial sensor device, would require the detection of three intersecting maxima to determine that even a single touch is present.

When used with split tri-axial sensor devices, the operation 1006 of evaluating the number and locations of maxima intersections also requires the presence of maxima from all three axes to indicate a touch. Intersections of only two maxima are by default considered invalid touches. However, once the presence of a touch within one section is determined to be valid, it may be tracked across the boundary into the adjacent section in the same way that a touch is tracked on a split XY sensor matrix. In another embodiment, the method 1100 includes detecting three or more substantially simultaneous touches and resolving at least two locations of the three or more substantially simultaneous touches in the section of the split touch-sensor device (e.g., tri-axial sensing).

In another embodiment, the method 1000 of FIG. 10 includes detecting and resolving the locations of three substantially simultaneous touches on a section of a split touch-sensor device (e.g., quad-axial sensing), and resolving locations of up to three substantially simultaneous touches in each section. In this embodiment, the method includes determining a number of four-axis intersections (e.g., a maximum is present for each axis at one intersecting location) on the touch-sensor device to determine if an invalid touch is present on the touch-sensor device. If the number of four-axis intersections is less than five, then the four-axis intersections are determined to be actual touches, and the corresponding locations may be resolved. However, if the number of four-axis intersections is greater than four, then one or more invalid touches are present on the touch-sensor device, and the positions of the four-axis intersections cannot all be resolved. The method may include ignoring the detected touches when an invalid touch is present on the touch-sensor device. Alternatively, the method may include detecting and resolving locations of a single or multiple substantially simultaneous touches on a multi-axial touch-sensor device that has more than four axes. It should be noted that although the embodiments herein have been described as being configured to detecting and resolving multiple substantially simultaneous touches, the embodiments described herein are also configured to detect and resolve combinations of touches on the touch-sensor devices that are less than the supported maximum (e.g., one or two for a quad-axial device section), as well as detecting and resolving multiple substantially sequential touches on the touch-sensor device.

As described above, the embodiments described herein may provide multi-axial scanning (e.g., three or more axes) to improve the spatial resolution of the detected locations. The embodiments may also provide the ability to resolve the locations of two or more substantially simultaneous touches without the use of an APA array. The embodiments may also provide the ability to route three axes on two layers. The embodiments also may provide layout of tri-axial and quad-axial matrices for low and high sheet-resistance materials.

In one embodiment, the touch-sensor device is a touchpad having a first linear slider and a second linear slider, wherein the first and second linear sliders are adjacently disposed in a first axis of the touchpad. The touchpad also has a third linear slider disposed in a second axis of the touchpad. The touchpad is coupled to a processing device that is configured to receive a plurality of signals from the touchpad to detect one or more touches on the touchpad, and to resolve locations of the one or more touches on the touchpad. In another embodiment, the touch-sensor device is a touch screen. In another embodiment, the apparatus is a multi-zoned touch-sensor device configured to resolve locations of two substantially simultaneous touches without an APA array of sensor elements in the touch-sensor device. In another embodiment, the touch-sensor device includes a tri-axial hexagonal sensing grid configured with dual-touch resolution in each section of the touch-sensor device. The tri-axial hexagonal sensing grid may be disposed on one or more substrates with low-sheet-resistance material. In another, the touch-sensor device includes a tri-axial diamond sensing grid configured with dual-touch resolution in each section of the touch-sensor device. The tri-axial diamond sensing grid may be disposed on one or more substrates with low or high-sheet-resistance material. In one embodiment, the tri-axial sensing grids of each section are routed on two layers. Alternatively, the tri-axial sensing grids of each section may be routed on more or less layers than two.

It should be noted that although various embodiments described herein are capable of detecting multiple substantially simultaneous touches, in other embodiments, the touch-sensor device is also configured to detect a single touch on the touch-sensor device, and resolve a single location of the single touch. The embodiments described herein are capable of resolving locations of two or more substantially simultaneous touches when the two or more substantially simultaneous touches share a common axis.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus, comprising:
   a first set of sensor elements disposed in a first axis in a plane of a touch-sensor device;
   a second set of sensor elements and a third set of sensor elements disposed in a second axis in the plane, wherein the second set of sensor elements is disposed in a first section of the touch-sensor device and the third set of sensor elements is disposed in a second section of the touch-sensor device that is adjacent to the first section, wherein the first set, second set, and third set of sensor elements are configured to be separately scanned to detect a presence of one or more conductive objects on the touch-sensor device; and
   a processing device coupled to the first set, second set, and third set of sensor elements, wherein the processing device is configured to detect the presence of the one or more conductive objects on the touch-sensor device, and wherein the processing device is configured to resolve a plurality of locations of a plurality of substantially simultaneous touches on the touch-sensor device without an all-points-addressable array of sensor elements in the touch-sensor device.

2. The apparatus of claim 1, wherein the processing device is configured to resolve the plurality of locations by resolving a first location of the plurality of locations in the first section of the second axis of the touch-sensor device, and resolving a second location in the second section of the second axis of the touch-sensor device using the first, second, and third sets of sensor elements.

3. The apparatus of claim 1, wherein the processing device comprises a capacitance-sensing circuit to separately scan the first, second, and third sets of sensor elements.

4. The apparatus of claim 1, wherein the processing device comprises a plurality of capacitance-sensing circuits to separately scan the first, second, and third sets of sensor elements.

5. The apparatus of claim 1, wherein the second set of sensor elements comprises:
   a first subset of sensor elements disposed in the second axis in the plane, wherein the first subset is disposed in a third section of the touch-sensor device; and
   a second subset of sensor elements disposed in the second axis in the plane, wherein the second subset is disposed in a fourth section of the touch-sensor device that is adjacent to the third section, wherein the first set, third set, first subset, and second subset of sensor elements are configured to be separately scanned to detect the presence of the one or more conductive objects on the second, third, and fourth sections of the second axis of the touch-sensor device.

6. The apparatus of claim 5, wherein the processing device is configured to resolve the plurality of locations by resolving a single location of the plurality of locations, if any, on each of the second, third, and fourth sections of the second axis of the touch-sensor device using the first set, third set, first subset, and second subset of sensor elements.

7. The apparatus of claim 1, wherein the first set of sensor elements comprises:
   a first subset of sensor elements disposed in the first axis in the plane, wherein the first subset is disposed in a third section of the touch-sensor device; and
   a second subset of sensor elements disposed in the first axis in the plane, wherein the second subset is disposed in a fourth section of the touch-sensor device that is adjacent to the third section, wherein the second set, third set, first subset, and second subset of sensor elements are configured to be separately scanned to detect the presence of the one or more conductive objects on the first, second, third, and fourth sections of the touch-sensor device.

8. The apparatus of claim 7, wherein the processing device is configured to resolve the plurality of locations by resolving a single location of the plurality of locations, if any, on each of the first and second sections of the second axis and the third and fourth sections of the first axis of the touch-sensor device using the second set, third set, first subset, and second subset of sensor elements.

9. The apparatus of claim 7, wherein the processing device comprises a plurality of capacitance-sensing circuits to separately scan the first set, second set, and third set of sensor elements substantially parallel in time.

10. The apparatus of claim 1, further comprising a fourth set of sensor elements disposed in a third axis in the plane of the touch-sensor device, wherein the first set, second set, third set, and fourth set of sensor elements are configured to be separately scanned to detect the presence of the one or more conductive objects on the first and second sections of the second axis of the touch-sensor device, and wherein the processing device is configured to resolve up to two locations of the plurality of locations, if any, on each of the first and second sections of the touch-sensor device using the first set, second set, third set, and fourth set of sensor elements.

11. A method, comprising:
   detecting a plurality of substantially simultaneous touches on a touch-sensor device having a plurality of sections in at least one axis of the touch-sensor device; and
   resolving a plurality of locations of the plurality of substantially simultaneous touches on the touch-sensor device when the plurality of substantially simultaneous touches are detected on the touch-sensor device without an all-points-addressable array (APA) array of sensor elements in the touch-sensor device, wherein said resolving comprises:
      resolving a first location of the plurality of locations in a first section of the plurality of sections; and
      resolving a second location of the plurality of locations in a second section of the plurality of sections that is adjacent to the first section;
      wherein resolving each of the first and second locations comprises:
         scanning a first set of sensor elements disposed in a first axis of the touch-sensor device;
         scanning a second set of sensor elements disposed in a second axis of the touch-sensor device, wherein the second set of sensor elements are disposed in the first section; and
         scanning a third set of sensor elements disposed in the second axis of the touch-sensor device, wherein the third set of sensor elements are disposed in the second section.

12. The method of claim 11, wherein said resolving each of the first and second locations further comprises:
   resolving the first location of a first touch of the plurality of simultaneous touches in the first section using scan results from the first set of sensor elements and the second set of sensor elements; and
   resolving the second location of a second touch of the plurality of simultaneous touches in the second section using scan results from the first set of sensor elements and the third set of sensor elements.

13. The method of claim 12, wherein said scanning the second and third sets of sensor elements comprises separately scanning the first section and the second section substantially parallel in time.

14. The method of claim 11, further comprising resolving a plurality of locations, if any, in one of the plurality of sections of the touch-sensor device, wherein said resolving the plurality of locations in one of the plurality of sections comprises:
   sensing for presences of conductive objects on the first axis of the touch-sensor device;
   sensing for presences of conductive objects on the second axis of the touch-sensor device;
   sensing for presences of conductive objects on a third axis of the touch-sensor device;
   determining locations where the sensed presences of the three axis intersect on the one of the plurality of sections of the touch-sensor device to determine the actual touches;
   determining an actual touch when the number of intersections of the presences is three; and
   determining an invalid touch when the number of intersections of the presence is less than three.

15. The method of claim 11, wherein resolving the plurality of locations of the plurality of substantially simultaneous touches on the touch-sensor device further comprises:
   storing in memory the first and second locations detected in a first scan;
   detecting a second plurality of substantially simultaneous touches during a second scan;
   identifying an invalid touch, if any, when the locations of the detected second plurality of substantially simultaneous touches are not within a specified limit in the change of distance from the first and second locations stored in the memory; and
   removing the identified invalid touch, if any.

16. The method of claim 11, wherein resolving the plurality of locations of the plurality of substantially simultaneous touches on the touch-sensor device further comprises resolving the plurality of locations when one of the plurality of substantially simultaneous touches moves from being detected in the second section to being detected in the first section.

17. The method of claim 16, further comprising:
   detecting a first touch of the plurality of substantially simultaneous touches in the first section and a second touch of the plurality of substantially simultaneous touches in the second section during a first scan;
   detecting the first and second touches in the first section during a second scan;
   identifying an invalid touch, if any, created by the presence of the first and second touches both being detected in the first section using the locations of the first and second touches detected during the first scan; and
   removing the identified invalid touch, if any, to resolve the plurality of locations of the plurality of substantially simultaneous touches on the touch-sensor device.

18. The method of claim 16, further comprising:
   detecting a first touch of the plurality of substantially simultaneous touches in the first section and a second touch of the plurality of substantially simultaneous touches in the second section during a first scan;
   storing in memory information regarding the locations of the first and second touches detected in the first scan;
   determining whether each touch detected during the first scan is within a specified distance from the boundary between the first and second sections;
   detecting the first and second touches in the first section during a second scan;
   identifying valid touches for the first and second touches in the first section during the second scan using the stored information to resolve the locations of the first and second touches within the first section during the second scan;
   removing an invalid touch, if any, created in the first section during the second scan using the stored information to resolve the locations of the first and second touches within the first second during the second scan.

* * * * *